US012794699B1

(12) United States Patent
Al-Sayed Ahmad

(10) Patent No.: US 12,794,699 B1
(45) Date of Patent: Nov. 10, 2026

(54) ZERO LOCAL EXECUTION USER SESSIONS VIA CLOUD EXECUTION SERVICE

(71) Applicant: Mohummud Anwar Na'em Al-Sayed Ahmad, Dubai (AE)

(72) Inventor: Mohummud Anwar Na'em Al-Sayed Ahmad, Dubai (AE)

(73) Assignee: Mohummud Anwar Na'em Al-Sayed Ahmad, Dubai (AE)

( * ) Notice: Subject to any disclaimer, the term of this patent is extended or adjusted under 35 U.S.C. 154(b) by 0 days.

(21) Appl. No.: 19/444,769

(22) Filed: Jan. 9, 2026

(51) Int. Cl.
*H04L 9/32* (2006.01)

(52) U.S. Cl.
CPC .......... *H04L 9/3213* (2013.01); *H04L 9/3247* (2013.01); *H04L 9/3297* (2013.01)

(58) Field of Classification Search
CPC .... H04L 9/3213; H04L 9/3247; H04L 9/3297
See application file for complete search history.

(56) References Cited

U.S. PATENT DOCUMENTS

| | | | | |
|---|---|---|---|---|
| 9,756,050 | B1 * | 9/2017 | Brandwine | H04L 63/102 |
| 11,394,698 | B2 * | 7/2022 | Lev | H04L 9/085 |
| 11,431,513 | B1 * | 8/2022 | Cannata | H04L 9/3213 |
| 11,503,031 | B1 * | 11/2022 | Hu | G06F 21/6218 |
| 12,088,647 | B1 | 9/2024 | Pirnazar | |
| 2020/0313852 | A1 * | 10/2020 | Cao | G06F 21/6209 |
| 2022/0076240 | A1 * | 3/2022 | Ghani | G06Q 20/12 |
| 2023/0015246 | A1 * | 1/2023 | Kline | H04L 9/3271 |
| 2024/0129297 | A1 * | 4/2024 | Obulareddy | H04L 63/0236 |
| 2024/0346117 | A1 * | 10/2024 | Baror | G06F 21/31 |

(Continued)

FOREIGN PATENT DOCUMENTS

| | | | |
|---|---|---|---|
| WO | 2024045141 | A1 | 3/2024 |
| WO | 2024205675 | A1 | 10/2024 |
| WO | 2025081856 | A1 | 4/2025 |

OTHER PUBLICATIONS

Metcalf, Sean. "Kerberos, Active Directory's Secret Decoder Ring". Article. Active Directory Pentest Recon Part 1: SPN Scanning aka Mining Kerberos Service Principal Names. Sep. 12, 2014. https://adsecurity.org/?p=214.

(Continued)

*Primary Examiner* — Shanto Abedin
(74) *Attorney, Agent, or Firm* — Boyle Fredrickson S.C.

(57) ABSTRACT

Methods, network nodes and systems related to executing provider service logic in a cloud execution service and for transmitting non-executable interface data to a user gateway operating in a terminal input state. A method includes receiving encrypted input data cryptographically bound to a user authorization token from a user gateway and decrypting the encrypted input data to obtain user input events. The method includes identifying a target service based at least in part on the user input events and obtaining a provider consent token comprising a service logic reference identifier associated with the target service. The method includes validating the provider consent token and, responsive to successful validation, executing the provider service logic based on the user input events to determine a user-interface state. The method includes transmitting non-executable interface data representing the user-interface state to the user gateway for presentation. Disclosed apparatuses and systems may perform such method.

22 Claims, 6 Drawing Sheets

(56) References Cited

U.S. PATENT DOCUMENTS

| | | | | |
|---|---|---|---|---|
| 2024/0380595 | A1 | 11/2024 | Moyer | |
| 2025/0080503 | A1 * | 3/2025 | Obulareddy | H04L 63/0272 |

OTHER PUBLICATIONS

Short, Ed et al. "Public Key Cryptography for Initial Authentication in Kerberos (PKINIT) Freshness Extension". Internet Engineering Task Force. Microsoft Corporation. Feb. 2017.

Roscoe, A. W. et al. "Delay and Escrow in the Blockchain". Draft Article. Chieftin Lab, Shenzhen and University College Oxford Blockchain Research Centre.

"Confidential Space Security Overview".

Moyer, Keith et al. "How We Validated the Security Controls of Our New Confidential Space". Blog. Google. https://cloud.google.com/blog/products/identity-security/how-to-build-a-secure-confidential-space.

* cited by examiner

ZERO LOCAL EXECUTION USER SESSIONS VIA CLOUD EXECUTION SERVICE

TECHNICAL FIELD

The present disclosure relates to methods and systems for securely executing provider service logic in a cloud execution service and for transmitting non-executable interface data to a user gateway operating in a terminal input state.

BACKGROUND

Many computing systems require execution of provider service logic on a user device, which can entail local installation of executable artifacts, device-specific compatibility constraints across heterogeneous operating systems, and increased exposure to compromise arising from locally executing third-party logic. Although remote execution and streaming techniques exist, such techniques may still rely on substantial client software stacks and may not provide a unified, machine-enforceable mechanism for ensuring that execution remains continuously authorized throughout a session. Further, existing approaches may provide limited integrity assurance for the executed logic and limited tamper-evident traceability of session events, and may impose inefficient interface transmission overhead where output is conveyed as full-frame updates rather than state-based or differential representations.

SUMMARY

Accordingly, there is a need for systems, apparatuses, and methods that enable provider service logic to be executed by a cloud execution service while a user gateway operates in a terminal input state, such that user interactions are conveyed to the cloud execution service and output is returned as non-executable interface data for rendering at the user gateway. There is a further need for such systems to enforce cryptographic authorization and constraint compliance for session establishment and continued operation, including enforcing routing of user interactions via a controlled communication path, validating authorization state in a synchronized and ongoing manner to mitigate stale authorization, and isolating execution on a per-session basis with reduced post-session residue. There is a further need for such systems to support efficient interface transmission (including differential user interface updates), to provide integrity verification of executed service logic, and to generate integrity-protected evidence of session behavior, including tamper-evident execution records and verifiable indicators of session authenticity at the user gateway.

A first method is disclosed. The method may include receiving, such as at a cloud execution service, encrypted input data cryptographically bound to a user authorization token from a user gateway. The method may include decrypting, such as by the cloud execution service, the encrypted input data to obtain user input events. The method may include identifying, such as by the cloud execution service, a target service based e.g., on the user input events. The method may include obtaining a provider consent token associated with the target service, the provider consent token may e.g., comprising a service logic reference identifier. The method may include validating, such as by the cloud execution service, the provider consent token, e.g., to confirm provider authorization. The method may include instantiating, such as by the cloud execution service, an ephemeral execution container, this action may e.g., be responsive to successfully validating the provider consent token. The method may include retrieving, such as by the cloud execution service, provider service logic e.g., using the service logic reference identifier for execution within the ephemeral execution container. The method may include executing, such as in the ephemeral execution container, the provider service logic e.g., based on the user input events to determine a user-interface state. The method may include transmitting non-executable interface data representing the user-interface state from the cloud execution service to the user gateway.

In some examples, the target service may comprise a security-sensitive transaction service in which the provider service logic implements a cloud-resident wallet-type interface for initiating, approving, and/or authorizing digital transactions. In such examples, transaction authorization decisions and cryptographic authorization artifact generation (e.g., signature and/or token generation) may be performed within an ephemeral execution container of the cloud execution service, while the user gateway operates the user device in a terminal input state and presents an interactive transaction interface via non-executable interface data. Sensitive transaction state and/or cryptographic key material used by the provider service logic may for example be maintained outside the user device.

A first system is disclosed. The system may comprise one or more processors and one or more non-transitory computer-readable media storing instructions that, when executed by the one or more processors, cause performance of operations. The operations may include receiving, such as at a cloud execution system, encrypted input data cryptographically bound to a user authorization token from a user gateway. The operations may include decrypting, such as by the cloud execution system, the encrypted input data to obtain user input events. The operations may include identifying, such as by the cloud execution system, a target service based on the user input events. The operations may include obtaining a provider consent token associated with the target service, the provider consent token may e.g., comprise a service logic reference identifier. The operations may include validating, such as by the cloud execution system, the provider consent token, e.g., to confirm provider authorization. The operations may include instantiating, such as by the cloud execution system, an ephemeral execution container, this action may e.g., be responsive to successfully validating the provider consent token. The operations may include retrieving, such as by the cloud execution system, provider service logic e.g., using the service logic reference identifier for execution within the ephemeral execution container. The operations may include executing, such as in the ephemeral execution container, the provider service logic e.g., based on the user input events to determine a user-interface state. The operations may include transmitting non-executable interface data representing the user-interface state from the cloud execution system to the user gateway.

A second method is disclosed. The method may be performed, e.g., by a user gateway associated with a user device. The method may include capturing, such as at the user device via the user gateway, raw user interactions. The method may include generating, such as by the user gateway, encrypted input data from the raw user interactions and generating a user authorization token cryptographically bound to the encrypted input data. The method may include transmitting, such as by the user gateway, the encrypted input data to a cloud execution service, e.g., to trigger instantiation of an ephemeral execution container based on a provider consent token. The method may include receiving, such as from the cloud execution service at the user gateway, non-executable interface data representing a user-interface state, wherein the user-interface state may e.g., be determined by the cloud execution service executing provider service logic within the ephemeral execution container based on user input events derived from the raw user interactions. The method may include presenting, such as at the user device via the user gateway, the non-executable interface data.

A second system is disclosed. The system may comprise one or more processors and one or more non-transitory computer-readable media storing instructions that, when executed by the one or more processors, cause performance of operations. The operations may include capturing, such as at a user device via a user gateway system, raw user interactions. The operations may include generating, such as by the user gateway system, encrypted input data from the raw user interactions and generating a user authorization token cryptographically bound to the encrypted input data. The operations may include transmitting, such as by the user gateway system, the encrypted input data to a cloud execution service, e.g., to trigger instantiation of an ephemeral execution container based on a provider consent token. The operations may include receiving, such as from the cloud execution service at the user gateway system, non-executable interface data representing a user-interface state, wherein the user-interface state may e.g., be determined by the cloud execution service executing provider service logic within the ephemeral execution container based on user input events derived from the raw user interactions. The operations may include presenting, such as at the user device via the user gateway system, the non-executable interface data.

A third method is disclosed. The method may be performed, e.g., by a provider gateway associated with a target service. The method may include receiving, such as at the provider gateway from a cloud execution service, an authorization request associated with a user session. The method may include generating, such as by the provider gateway and responsive to the authorization request, a provider consent token, wherein the provider consent token may e.g., include: (i) a service logic reference identifier indicating a location of provider service logic to be retrieved by the cloud execution service; and (ii) a cryptographic signature configured to enable the cloud execution service to confirm provider authorization. The method may include transmitting, such as by the provider gateway to the cloud execution service, the provider consent token, thereby enabling the cloud execution service to instantiate an ephemeral execution container and execute the provider service logic identified by the service logic reference identifier.

A third system is disclosed. The system may comprise one or more processors and one or more non-transitory computer-readable media storing instructions that, when executed by the one or more processors, cause performance of operations. The operations may include receiving, such as at a provider gateway system from a cloud execution service, an authorization request associated with a user session. The operations may include generating, such as by the provider gateway system and responsive to the authorization request, a provider consent token, wherein the provider consent token may e.g., include: (i) a service logic reference identifier indicating a location of provider service logic to be retrieved by the cloud execution service; and (ii) a cryptographic signature configured to enable the cloud execution service to confirm provider authorization. The operations may include transmitting, such as by the provider gateway system to the cloud execution service, the provider consent token, thereby enabling the cloud execution service to instantiate an ephemeral execution container and execute the provider service logic identified by the service logic reference identifier.

It is an advantage of the present disclosure to provide a terminalized execution architecture in which a user gateway operates in a terminal input state while provider service logic is executed by a cloud execution service, thereby reducing compute and persistent storage utilization at the user device.

Further, it is an advantage of the present disclosure that signal-level capture and rendering by the user gateway enables operation across heterogeneous user devices and underlying operating systems, thereby improving device portability while maintaining the terminal input state.

It is a further advantage of the present disclosure that uplink transmission of raw user interactions via an exclusive routing path can reduce exposure of encrypted input data to interception, access, or processing by local software components on the user device.

Further, it is an advantage of the present disclosure that output from the cloud execution service can be conveyed to the user gateway as non-executable interface data that excludes provider service logic, thereby reducing exposure of executable artifacts at the user device and increasing resistance to client-side code tampering.

It is a further advantage of the present disclosure that the non-executable interface data may comprise differential user interface updates, thereby reducing downlink bandwidth consumption and interface reconstruction overhead relative to transmission of full interface frames.

Further, it is an advantage of the present disclosure that a user authorization token may be cryptographically bound to encrypted input data, thereby enabling authentication of the origin of raw user interactions and providing replay resistance with respect to a user consent timestamp.

It is a further advantage of the present disclosure that execution constraints embedded in a provider consent token can be mechanically enforced by the cloud execution service to restrict execution of provider service logic to authorized policy scopes and jurisdictional limits.

Further, it is an advantage of the present disclosure that a service logic reference identifier comprising integrity data enables validation of retrieved provider service logic prior to execution, thereby mitigating substitution of an unapproved logic module.

It is a further advantage of the present disclosure that authorization and execution can be decoupled by transmitting a provider consent token independently of provider service logic, thereby reducing authorization-message payload while preserving deterministic retrieval of the authorized logic module via the service logic reference identifier.

Further, it is an advantage of the present disclosure that Triple-Sync validation and recursive re-validation can gate instantiation and/or continued operation of an ephemeral execution container, thereby reducing the likelihood that execution proceeds based on stale user authorization or provider authorization.

It is a further advantage of the present disclosure that per-session instantiation of an ephemeral execution container together with enforcement of a zero-residue execution state can reduce cross-session persistence of provider service logic and determined user-interface state after session termination.

Further, it is an advantage of the present disclosure that response latency can be monitored against a configurable response-time threshold δ and Auto-Revocation can be triggered upon threshold violation and/or validation failure, thereby bounding end-to-end interaction latency for a valid execution session.

It is a further advantage of the present disclosure that the system can seal a cryptographically signed execution trace incorporating a Merkle-timestamped audit trail, thereby providing tamper-evident integrity assurance for recorded execution events and session determinations.

Further, it is an advantage of the present disclosure that a zero-local-processing proof backed by a hardware attestation mechanism can provide verifiable evidence that the user gateway adhered to the terminal input state during a session.

It is a further advantage of the present disclosure that a digitally signed Trusted UI Overlay refreshed at a predetermined frequency can mitigate UI redress attacks by providing a verifiable session-authenticity indicator at the user device.

Further, it is an advantage of the present disclosure that an AI governance module can condition issuance of an AI verification timestamp on behavioral analysis and scope/intent alignment, thereby mitigating anomalous or unauthorized execution requests relative to an authorized scope defined by the provider consent token.

It is a further advantage of the present disclosure that a target service can be identified based on semantic analysis of user input events to select provider service logic for retrieval, thereby enabling service selection without requiring local execution of provider service logic at the user device.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
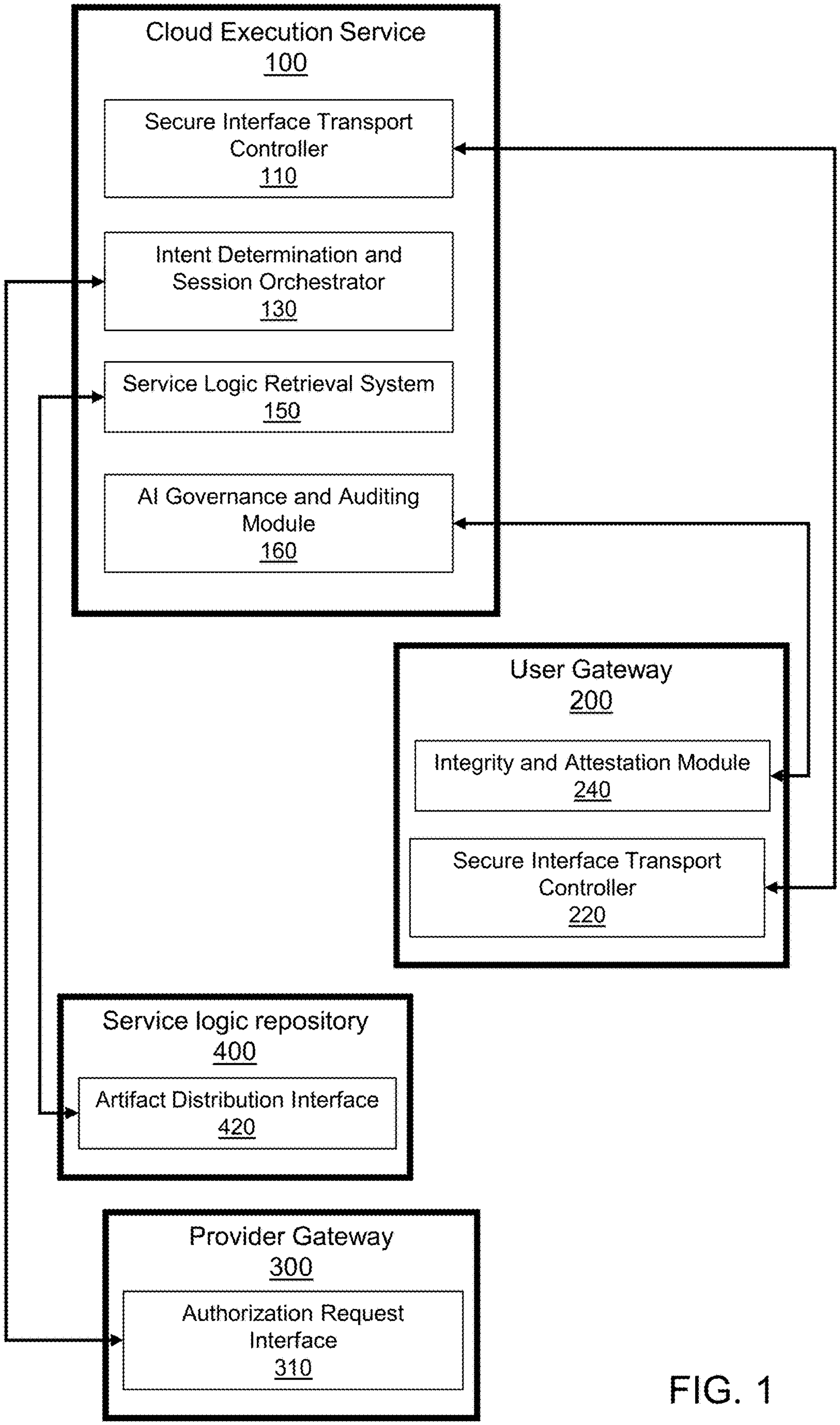
FIG. 1 is a diagram illustrating an example system architecture in which a user gateway is communicatively coupled with a cloud execution service, a provider gateway, and a service logic repository.

FIG. 1 illustrates an example system architecture in which a user gateway 200 is communicatively coupled with a cloud execution service 100, a provider gateway 300, and a service logic repository 400, such that provider service logic is executable within the cloud execution service 100 while the user gateway 200 presents an interactive user interface using non-executable interface data.

By employing configuration illustrated in FIG. 1, the user device can avoid local installation and execution of provider service logic and can reduce local compute and persistent storage requirements associated with provider service logic.

In some examples, the user gateway 200 is associated with (and/or implemented on) a user device and is configured to operate the user device in a terminal input state in which the user device performs input capture and output presentation while refraining from executing provider service logic locally. In some examples, the user gateway 200 includes a raw input capture and tokenization engine 210 configured to capture raw user interactions (e.g., device-captured input signals) and to generate encrypted input data that is devoid of semantic interpretation and/or structured metadata. The raw input capture and tokenization engine 210 can further generate a user authorization token that is cryptographically bound to the encrypted input data (and, in some examples, to a user consent timestamp $T_u$) to evidence user consent and gate admissibility of the associated encrypted input data.

In some examples, the user gateway 200 includes a secure interface transport controller 220 configured to transmit the encrypted input data and the user authorization token to the cloud execution service 100 via a secure uplink. The secure uplink can be implemented as (or can include) an exclusive routing path that is configured to isolate the encrypted input data from interception, access, or processing by a local operating system, a local application, and/or a third-party service of the user device.

On the cloud side, the cloud execution service 100 can include a secure interface transport controller 110 configured to receive the encrypted input data cryptographically bound to the user authorization token via the secure uplink, and to manage session streaming. In some examples, the cloud execution service 100 includes a cryptographic authorization engine 120 configured to decrypt the encrypted input data to obtain user input events and to enforce cryptographic bindings associated with the user authorization token and/or related session parameters.

In some examples, the cloud execution service 100 includes an intent determination and session orchestrator 130 configured to identify a target service based on the user input events, for example using semantic analysis of the user input events. As illustrated by the bidirectional communication path of FIG. 1, the intent determination and session orchestrator 130 can be communicatively coupled with an authorization request interface 310 of the provider gateway 300 to obtain a provider consent token associated with the identified target service. In some examples, the provider gateway 300 includes a consent token generation engine 320 configured to generate the provider consent token responsive to an authorization request, wherein the provider consent token comprises (at least) a service logic reference identifier and a cryptographic signature (and, optionally, a provider consent timestamp $T_p$ and/or execution constraints).

In some examples, the cryptographic authorization engine 120 validates the provider consent token to confirm provider authorization, for example by verifying the cryptographic signature and one or more validity conditions contained in the provider consent token, and/or by verifying that user input events comply with execution constraints embedded in the provider consent token. Responsive to (and/or conditional upon) successful validation of the provider consent token, the cloud execution service 100 can instantiate an ephemeral execution container, for example using an ephemeral container lifecycle manager 140. In some examples, the ephemeral execution container isolates execution of provider service logic from an underlying operating system of the cloud execution service 100 such that the underlying operating system performs no application logic for the provider service logic, and the container can enforce a zero-residue execution state by deleting retrieved logic and determined user-interface state upon termination.

As further illustrated in FIG. 1, the cloud execution service 100 can include a service logic retrieval system 150 configured to retrieve provider service logic using the service logic reference identifier (e.g., obtained from the provider consent token). The service logic retrieval system 150 can be communicatively coupled with an artifact distribution interface 420 of the service logic repository 400 to request and receive the provider service logic (e.g., compiled binaries and/or container images). In some examples, the service logic repository 400 includes logic artifact storage 410 configured to store versioned provider service logic modules indexed by service logic reference identifiers.

In some examples, the service logic repository operates as an execution-authoritative cloud store for provider service logic. In further examples the execution of provider service logic is admissible only when retrieved via the service logic repository using a valid service logic reference identifier. In further examples locally supplied, client-provided, or externally sourced service logic is non-admissible for execution.

In some examples, the ephemeral execution container executes the retrieved provider service logic based on user input events to determine a user-interface state. The cloud execution service 100 can generate, and transmit to the user gateway 200, non-executable interface data representing the user-interface state. As depicted by the downlink arrow of FIG. 1, the cloud-side secure interface transport controller 110 can transmit the non-executable interface data to the user gateway secure interface transport controller 220 for presentation at the user device. In some examples, the non-executable interface data excludes the provider service logic and comprises at least one of a pixel stream, a frame stream, a vector-based interface representation, and/or a differential user interface update. In some examples, the user gateway 200 includes a signal-level rendering engine 230 configured to render the received non-executable interface data into a visual display without semantic interpretation of application logic and without local execution of the provider service logic.

In one example, the provider service logic retrieved via the service logic reference identifier corresponds to a transaction authorization application. In such examples, decrypted user input events represent user interactions with a transaction interface, and execution of the provider service logic within the ephemeral execution container includes generating a transaction instruction representation and producing a cryptographic authorization artifact (e.g., a signature, token, or other cryptographic proof) under policy control. The user gateway 200 presents the corresponding interactive interface via non-executable interface data and refrains from executing transaction logic locally.

In some examples, the target service comprises a communications service (e.g., messaging, electronic mail, and/or call control), likewise executed as provider service logic within the ephemeral execution container, while the user gateway remains limited to input capture and output presentation under the terminal input state.

Optionally, and as shown by the optional/dashed communication path in FIG. 1, the user gateway 200 can include an integrity and attestation module 240 configured to generate a zero-local-processing proof evidencing that the user device operated in the terminal input state and maintained no application-level session state for the provider service logic, wherein the proof can be backed by hardware attestation mechanisms (e.g., a trusted execution environment and/or secure element). In some examples, such attestation evidence is exported to an AI governance and auditing module 160 of the cloud execution service 100, which can be configured to perform synchronization verification (e.g., using $T_u$, $T_p$, and an AI verification timestamp $T_{ai}$) and/or to generate and seal a cryptographically signed execution trace for export outside the ephemeral execution container.

For example, the target service may comprise a security-sensitive transaction service in which provider service logic includes cryptographic verification and/or cryptographic signing operations performed during a user session. More specifically, the provider service logic may implement a cloud-resident wallet-type interface for initiating and authorizing digital transactions, where transaction authorization decisions and signature generation are performed within an ephemeral execution container of the cloud execution service, while the user gateway operates the user device in the terminal input state. In some examples, sensitive transaction state and/or cryptographic key material used by such provider service logic are maintained outside the user device (e.g., within cloud-side protected storage and/or a hardware-backed protection boundary), consistent with the Zero Local Execution model and the Zero-Resident Policy.

Figure 2:
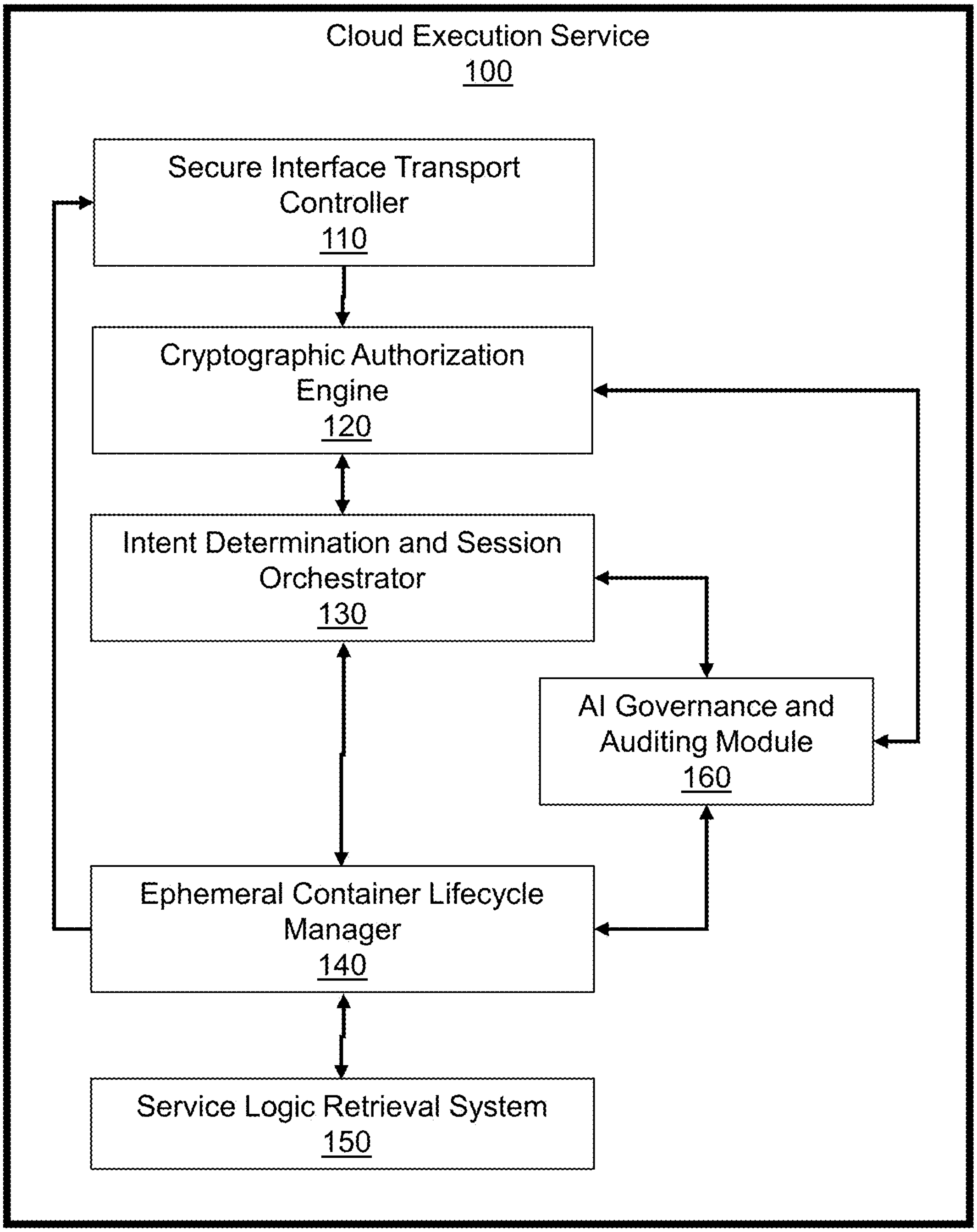
FIG. 2 is a diagram illustrating an example internal functional arrangement of the cloud execution service.

FIG. 2 illustrates an example internal functional arrangement of the cloud execution service 100, including inter-component communications among a secure interface transport controller 110, a cryptographic authorization engine 120, an intent determination and session orchestrator 130, an ephemeral container lifecycle manager 140, a service logic retrieval system 150, and an AI governance and auditing module 160.

In some examples, the secure interface transport controller 110 is configured to receive (e.g., via a secure uplink) encrypted input data that is cryptographically bound to a user authorization token, and to route a received encrypted input payload and associated token material to the cryptographic authorization engine 120 for cryptographic processing.

In some examples, the cryptographic authorization engine 120 is configured to decrypt the encrypted input data to obtain user input events, and to enforce cryptographic bindings associated with the user authorization token (e.g., origin/authenticity and replay-protection inputs, including a user consent timestamp $T_u$ where present). The cryptographic authorization engine 120 can provide (e.g., stream) the decrypted user input events to the intent determination and session orchestrator 130 for target-service identification.

In some examples, the intent determination and session orchestrator 130 includes (or is associated with) an intent determination engine configured to identify a target service based on a semantic analysis of the user input events (e.g., intent classification distinct from execution of provider service logic). In some examples, the intent determination and session orchestrator 130 is configured to obtain a provider consent token associated with the identified target service and to provide the provider consent token (and/or selected target-service context) to the cryptographic authorization engine 120 for validation and enforcement.

Accordingly, identifying the target service based on semantic analysis of user input events can select provider service logic for retrieval without requiring local execution of provider service logic at the user device.

In some examples, the cryptographic authorization engine 120 validates the provider consent token to confirm provider authorization, for example by verifying a cryptographic signature and one or more validity conditions, and/or by verifying that user input events comply with execution constraints embedded in the provider consent token. In some examples, outputs of the cryptographic authorization engine 120 (e.g., validation results, $T_u$ inputs, $T_p$ inputs where present, and/or constraint-compliance results) are provided to the AI governance and auditing module 160 for admissibility gating and/or auditability workflows.

In some examples, the AI governance and auditing module 160 is configured to generate an AI verification timestamp $T_{ai}$ and to perform synchronization verification against user and provider consent timestamps (e.g., $T_u$ and $T_p$) such that instantiation and/or continued operation of an ephemeral execution container is conditional on the synchronization verification. In some examples, the synchronization verification comprises determining that a time difference defined by $T_{ai}-\max(T_u, T_p)$ is less than or equal to a predetermined threshold N, and/or comprises recursive re-validation at a predetermined re-validation interval during a session.

In some examples, the intent determination and session orchestrator 130 is communicatively coupled with the AI governance and auditing module 160 to coordinate admissibility gating, trace sealing orchestration, and/or policy-based session governance, including (in some examples) behavioral analysis of user command patterns and scope/intent alignment relative to an authorized scope defined by the provider consent token.

In result, generating the AI verification timestamp $T_{ai}$ conditional upon behavioral analysis and scope/intent alignment can mitigate unauthorized or anomalous execution requests relative to an authorized scope defined by the provider consent token.

In some examples, responsive to (and/or conditional upon) successful validation and gating, the intent determination and session orchestrator 130 signals the ephemeral container lifecycle manager 140 to start a session and instantiate an ephemeral execution container. In some examples, the AI governance and auditing module 160 provides a permit/deny outcome (and/or policy gate) to the ephemeral container lifecycle manager 140 to control whether container instantiation proceeds.

In some examples, the ephemeral container lifecycle manager 140 is configured to instantiate ephemeral execution containers that isolate provider service logic from an underlying operating system of the cloud execution service 100, such that the underlying operating system performs no application logic for the provider service logic. In some examples, the ephemeral container lifecycle manager 140 is communicatively coupled with the service logic retrieval system 150 to request provider service logic using a service logic reference identifier (e.g., obtained from the provider consent token) and to receive a corresponding logic module into the isolated execution environment.

In some examples, the ephemeral container lifecycle manager 140 executes the retrieved provider service logic based on the user input events to determine a user-interface state, and generates (or causes generation of) non-executable interface data representing the user-interface state. As shown in FIG. 2, the ephemeral container lifecycle manager 140 can provide container-produced interface outputs to the secure interface transport controller 110 for downlink transmission as the non-executable interface data stream. In some examples, the non-executable interface data excludes provider service logic and comprises at least one of a pixel stream, a frame stream, a vector-based interface representation, or a differential user interface update.

By transmitting non-executable interface data that excludes provider service logic, the architecture can reduce exposure of executable artifacts at the user device and can increase resistance to client-side code tampering.

Additionally, where the non-executable interface data comprises a differential user interface update, downlink bandwidth and interface reconstruction overhead can be reduced relative to transmitting full interface frames In some examples, the ephemeral container lifecycle manager 140 is further configured to enforce a zero-residue execution state by deleting retrieved provider service logic and the determined user-interface state responsive to termination, and to monitor real-time response latency during session execution. In some examples, latency metrics are provided from the ephemeral container lifecycle manager 140 to the intent determination and session orchestrator 130, and session revocation and/or termination commands are provided from the intent determination and session orchestrator 130 to the ephemeral container lifecycle manager 140, for example responsive to a determination that a contractual response-time threshold $\delta$ is exceeded.

In some examples, the AI governance and auditing module 160 is communicatively coupled with the ephemeral container lifecycle manager 140 to receive container lifecycle events, execution-state commitments, and/or latency/threshold events, and to generate and seal a cryptographically signed execution trace upon termination for export to storage outside the ephemeral execution container. In some examples, the cryptographically signed execution trace includes a cryptographic commitment to an execution-state representation generated during execution and an AI risk-evaluation summary associated with the user input events, and can further include a contractual response-time stamp certifying latency compliance over a session.

Figure 3:
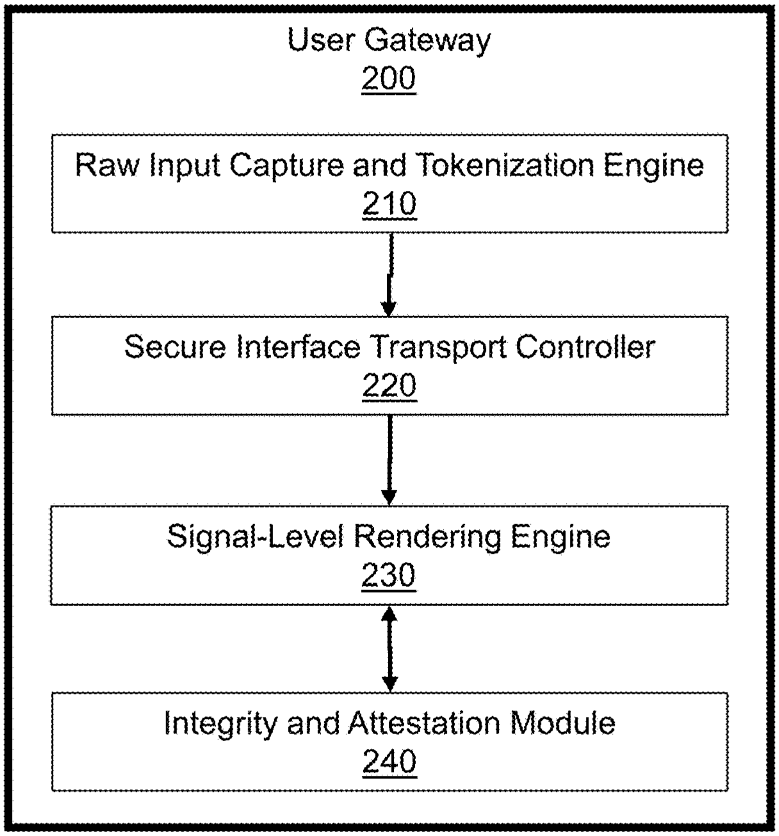
FIG. 3 is a diagram illustrating an example internal functional arrangement of the user gateway.

FIG. 3 illustrates an example internal functional arrangement of the user gateway 200, including inter-component communications among a raw input capture and tokenization engine 210, a secure interface transport controller 220, a signal-level rendering engine 230, and an integrity and attestation module 240.

By employing configuration illustrated in FIG. 3, the user device can avoid local installation and execution of provider service logic and can reduce local compute and persistent storage requirements associated with provider service logic.

In some examples, the raw input capture and tokenization engine 210 is configured to capture raw user interactions directly from device hardware and to generate encrypted input data that is devoid of semantic interpretation (and, in some examples, devoid of structured metadata). The raw input capture and tokenization engine 210 can further generate a user authorization token that is cryptographically bound to the encrypted input data and that includes a user consent timestamp $T_u$, thereby associating user consent with the specific encrypted input payload for subsequent admissibility gating.

Cryptographic binding of the user authorization token to the encrypted input data can authenticate origin of raw user interactions and can provide replay protection relative to the user consent timestamp $T_u$.

As illustrated by the directional relationship in FIG. 3, the raw input capture and tokenization engine 210 provides the encrypted input data and the user authorization token to the secure interface transport controller 220 for transmission. In some examples, the secure interface transport controller 220 is configured to manage an exclusive routing path (e.g., a secure uplink) that routes the encrypted input data exclusively from the user gateway 200 toward a cloud execution service and that is architecturally restricted to isolate the payload from interception, access, or processing by a local operating system, a local application, and/or a third-party service of the user device.

In this manner, the exclusive routing path can mitigate interception, access, or processing of encrypted input data by local software components of the user device.

In some examples, the secure interface transport controller 220 is further configured to receive, from the cloud execution service, non-executable interface data representing a user-interface state determined by cloud-side execution of provider service logic. As shown in FIG. 3, the secure interface transport controller 220 forwards received non-executable interface data to the signal-level rendering engine 230 for presentation.

In some examples, the signal-level rendering engine 230 is configured to perform signal-level rendering of the non-executable interface data to generate a visual display, without interpreting application semantics or business rules and without locally executing provider service logic. In some examples, the non-executable interface data comprises at least one of a pixel stream, a frame stream, a vector-based interface representation, or a differential user interface update, and excludes provider service logic itself.

Accordingly, the user gateway 200 can be deployed across heterogeneous user devices and underlying operating systems while preserving the terminal input state for provider service logic.

In some examples, the integrity and attestation module 240 is configured to verify that the user gateway 200 operated the user device in a terminal input state (e.g., input capture and output presentation while maintaining no application-level session state for provider service logic) and to generate a zero-local-processing proof evidencing such operation, optionally backed by a hardware attestation mechanism comprising a trusted execution environment and/or secure element. As depicted in FIG. 3, the integrity and attestation module 240 can be communicatively coupled to the secure interface transport controller 220 to obtain session integrity inputs and/or to provide integrity outputs (e.g., attestation material) for export, and can additionally be coupled to the signal-level rendering engine 230 to support trusted interface presentation.

In some examples, the integrity and attestation module 240 generates a trusted user interface overlay that is digitally signed and superposed onto the presented non-executable interface data, and refreshes the trusted user interface overlay periodically at a predetermined frequency to verify integrity of the user gateway 200 during presentation. In such examples, the integrity and attestation module 240 can provide overlay data (and/or overlay refresh triggers) to the signal-level rendering engine 230 via the depicted relationship, and can coordinate overlay delivery paths with the secure interface transport controller 220.

Figure 4:
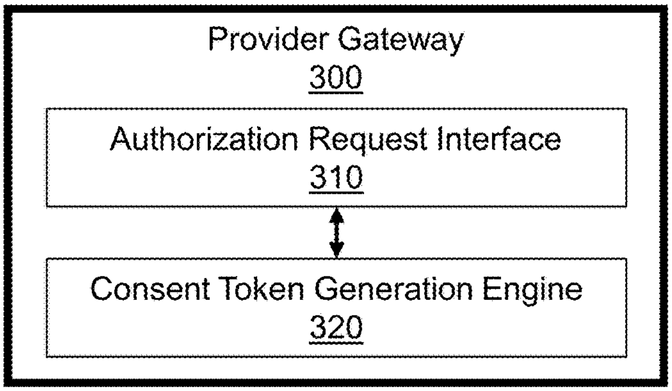
FIG. 4 is a diagram illustrating an example internal functional arrangement of the provider gateway.

FIG. 4 illustrates an example internal functional arrangement of the provider gateway 300, including inter-component communications between an authorization request interface 310 and a consent token generation engine 320.

In some examples, the authorization request interface 310 is configured to receive (and, optionally, validate) authorization requests associated with user sessions from a cloud execution service, thereby operating as an entry point for determining whether the cloud execution service is authorized to request access on behalf of a particular user and/or session context. As depicted by the bidirectional relationship in FIG. 4, the authorization request interface 310 can provide authorization-request content (e.g., session identifiers, target-service identifiers, and/or other context parameters) to the consent token generation engine 320, and can receive back a generated provider consent token for transmission to the cloud execution service.

In some examples, the consent token generation engine 320 is configured to generate, responsive to the authorization request, a provider consent token that mechanically gates cloud-side retrieval and instantiation of provider service logic. In some examples, the provider consent token comprises a service logic reference identifier indicating a location or identity of provider service logic to be retrieved by the cloud execution service, and a cryptographic signature configured to enable the cloud execution service to confirm provider authorization. In some examples, the provider consent token further comprises a provider consent timestamp $T_p$, and may further comprise one or more execution constraints (e.g., policy scopes, time windows, jurisdictional limits, repetition limits, and/or other validity conditions) configured to be enforceable by the cloud execution service.

In some examples, the authorization request interface 310 is configured to transmit the provider consent token generated by the consent token generation engine 320 to the cloud execution service, thereby enabling the cloud execution service to validate provider authorization using the cryptographic signature and to retrieve provider service logic using the service logic reference identifier.

In result, execution constraints embedded in the provider consent token can mechanically restrict cloud-side execution of provider service logic to authorized policy scopes and jurisdictional limits.

Figure 5:
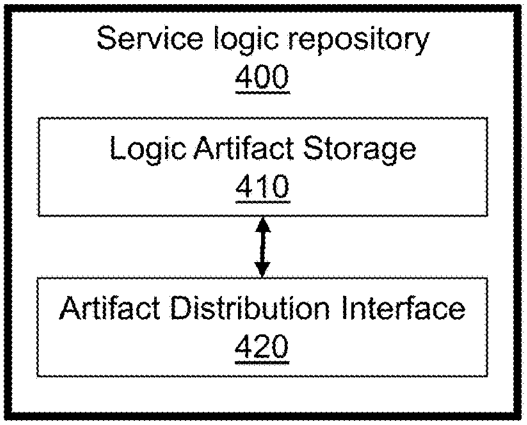
FIG. 5 is a diagram illustrating an example internal functional arrangement of the service logic repository.

FIG. 5 illustrates an example internal functional arrangement of the service logic repository 400, including inter-component communications between an artifact distribution interface 420 and logic artifact storage 410.

In some examples, the logic artifact storage 410 is configured to store versioned provider service logic modules indexed by unique service logic reference identifiers, thereby enabling location of a particular executable logic artifact using a corresponding service logic reference identifier. In some examples, the provider service logic comprises executable instructions (e.g., compiled binaries, interpreted scripts, bytecode, and/or models) that, when executed in an isolated cloud-side execution environment, determine a user-interface state.

As depicted by the bidirectional relationship in FIG. 5, the artifact distribution interface 420 is communicatively coupled with the logic artifact storage 410 to perform a lookup operation using a service logic reference identifier, fetch a corresponding versioned logic artifact, and return the fetched artifact to the artifact distribution interface 420 for distribution. In some examples, this lookup/fetch/return interaction can include selecting among multiple versions of provider service logic associated with a common service identifier based on the specific service logic reference identifier provided for a session.

In some examples, the artifact distribution interface 420 is configured to transmit retrieved provider service logic to a cloud execution service for use within ephemeral execution containers, including transmitting the retrieved logic in a format suitable for isolated execution, such as compiled binaries and/or container images. In this manner, the service logic repository 400 can support retrieval of provider service logic using a service logic reference identifier, while separating authorization data structures from executable logic artifacts.

Figure 6:
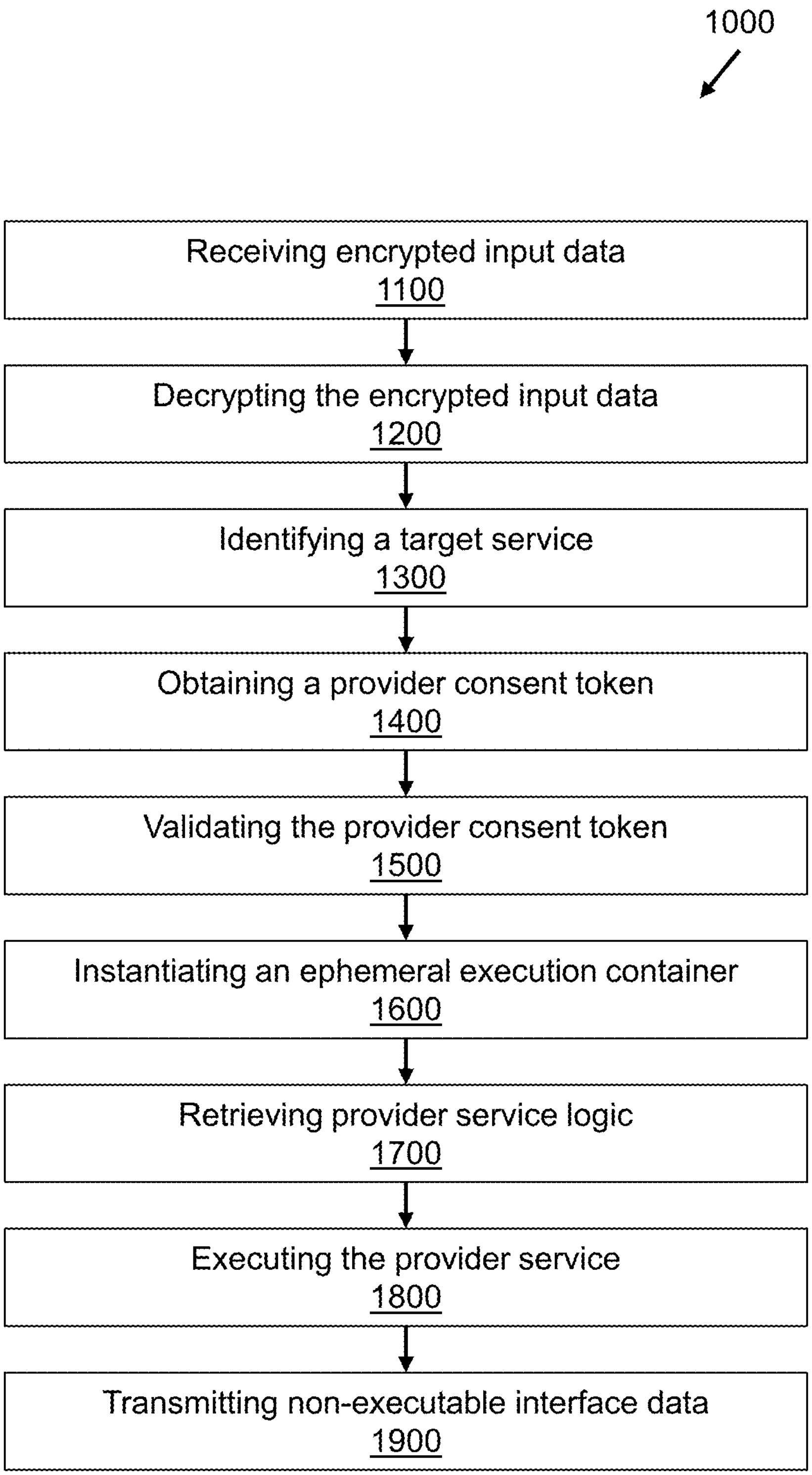
FIG. 6 is a flow-chart illustrating an example method for cloud-side execution operations performed by the cloud execution service.

FIG. 6 is a flow-chart illustrating an example method 1000 for operating operations according to this disclosure. Method 1000 may be performed, for example, by the cloud execution service 100, as described with reference to FIGS. 1 and 2. The example method 1000 in FIG. 6 comprises:

Receiving 1100, at a cloud execution service, encrypted input data cryptographically bound to a user authorization token from a user gateway. The receiving 1100 may, for example, be performed by the secure interface transport controller 110 of the cloud execution service 100 as described with reference to FIGS. 1-2.

Decrypting 1200, by the cloud execution service, the encrypted input data to obtain user input events. The decrypting 1200 may, for example, be performed by the cryptographic authorization engine 120 of the cloud execution service 100 as described with reference to FIGS. 1-2.

Identifying 1300, by the cloud execution service, a target service based on the user input events. The identifying 1300 may, for example, be performed by the intent determination and session orchestrator 130 of the cloud execution service 100 as described with reference to FIGS. 1-2.

Obtaining 1400 a provider consent token associated with the target service, the provider consent token comprising a service logic reference identifier. The obtaining 1400 may, for example, be performed by the intent determination and session orchestrator 130 of the cloud execution service 100, optionally via the authorization request interface 310 and consent token generation engine 320 of the provider gateway 300, as described with reference to FIGS. 1-2 and FIG. 4.

Validating 1500, by the cloud execution service, the provider consent token to confirm provider authorization. The validating 1500 may, for example, be performed by the cryptographic authorization engine 120 of the cloud execution service 100, optionally providing validation/admissibility outputs to the AI governance and auditing module 160, as described with reference to FIGS. 1-2.

Instantiating 1600, by the cloud execution service, an ephemeral execution container, responsive to successfully validating the provider consent token. The instantiating 1600 may, for example, be performed by the ephemeral container lifecycle manager 140 of the cloud execution service 100, optionally subject to permit/deny gating by the AI governance and auditing module 160, as described with reference to FIGS. 1-2.

Retrieving 1700, by the cloud execution service, provider service logic using the service logic reference identifier for execution within the ephemeral execution container. The retrieving 1700 may, for example, be performed by the service logic retrieval system 150 of the cloud execution service 100, optionally via the artifact distribution interface 420 and logic artifact storage 410 of the service logic repository 400, as described with reference to FIGS. 1-2 and FIG. 5.

Executing 1800, in the ephemeral execution container, the provider service logic based on the user input events to determine a user-interface state. The executing 1800 may, for example, be performed within an ephemeral execution container instantiated/managed by the ephemeral container lifecycle manager 140 of the cloud execution service 100 as described with reference to FIGS. 1-2.

Transmitting 1900 non-executable interface data representing the user-interface state from the cloud execution service to the user gateway. The transmitting 1900 may, for example, be performed by the secure interface transport controller 110 of the cloud execution service 100 (for downlink), optionally toward the secure interface transport controller 220 of the user gateway 200, as described with reference to FIGS. 1-3.

Figure 7:
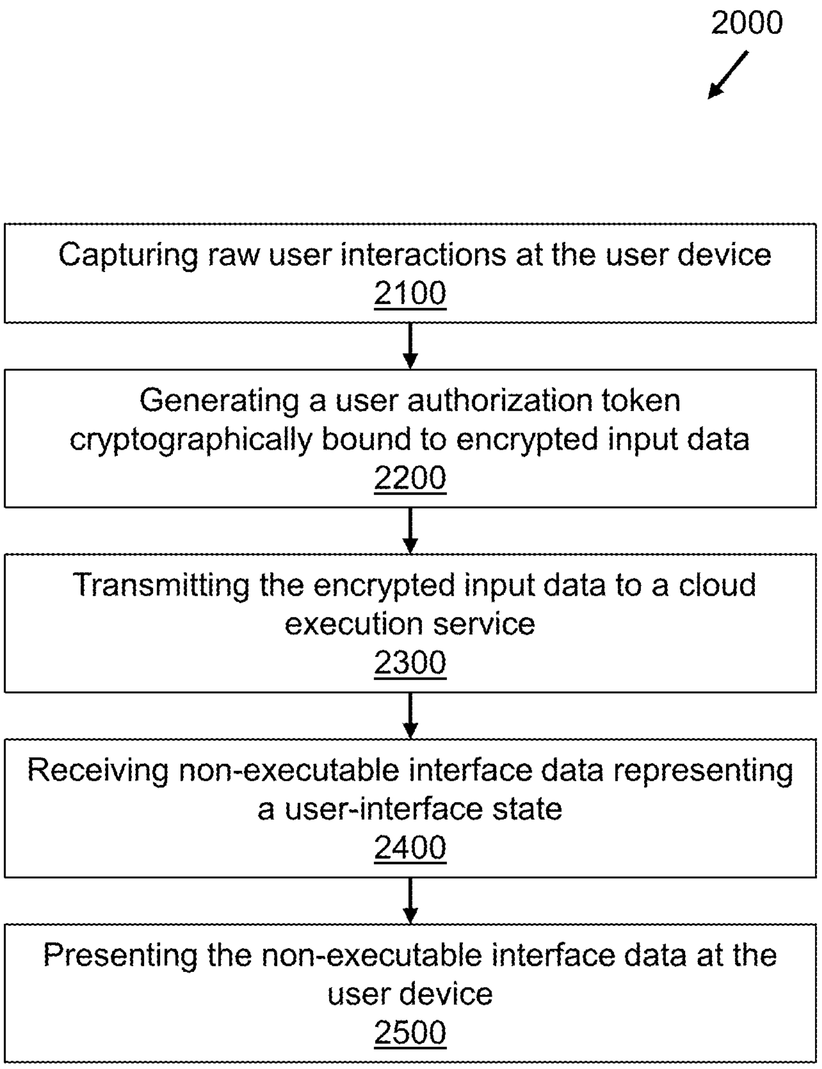
FIG. 7 is a flow-chart illustrating an example method for user-gateway operations.

FIG. 7 is a flow-chart illustrating an example method 2000 for operating operations according to this disclosure. Method 2000 may be performed, for example, by the user gateway 200 which may be associated and/or installed in a user device, as described with reference to FIGS. 1 and 3. The example method 2000 in FIG. 7 comprises:

Capturing 2100 raw user interactions at a user device. The capturing 2100 may, for example, be performed by the raw input capture and tokenization engine 210 of the user gateway 200 as described with reference to FIGS. 1 and 3.

Generating 2200 encrypted input data from the raw user interactions and generating a user authorization token. The generating 2200 (encrypted input data) may, for example, be performed by the raw input capture and tokenization engine 210 of the user gateway 200 as described with reference to FIGS. 1 and 3. The authorization token generation/binding may, for example, also be performed by the raw input capture and tokenization engine 210 of the user gateway 200 as described with reference to FIGS. 1 and 3.

Transmitting 2300 the encrypted input data to a cloud execution service. The may be configured such that the cloud execution service trigger instantiation of an ephemeral execution container based on a provider consent token. The transmitting 2300 may, for example, be performed by the secure interface transport controller 220 of the user gateway 200 as described with reference to FIGS. 1 and 3.

Receiving 2400, from the cloud execution service, non-executable interface data representing a user-interface state. Optionally, the user-interface state is/was determined by the cloud execution service executing provider service logic within the ephemeral execution container based on the user input events derived from the raw user interactions. The receiving 2400 may, for example, be performed by the secure interface transport controller 220 of the user gateway 200 as described with reference to FIGS. 1 and 3.

Presenting 2400 the non-executable interface data at the user device. The presenting 2400 may, for example, be performed by the signal-level rendering engine 230 of the user gateway 200, optionally with integrity overlay/attestation support by the integrity and attestation module 240, as described with reference to FIG. 3.

Figure 8:
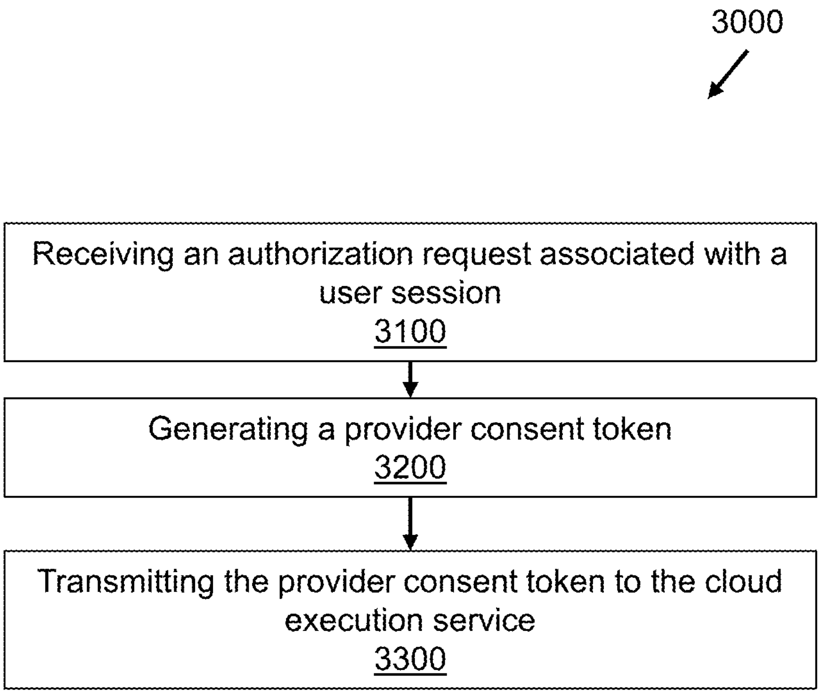
FIG. 8 is a flow-chart illustrating an example method for provider-gateway operations.

FIG. 8 is a flow-chart illustrating an example method 3000 for operating operations according to this disclosure. Method 3000 may be performed, for example, by the provider gateway 300 which may be associated with a target service, as described with reference to FIGS. 1 and 4. The example method 3000 in FIG. 8 comprises:

Receiving 3100, from a cloud execution service, an authorization request associated with a user session. The receiving 3100 may, for example, be performed by the authorization request interface 310 of the provider gateway 300 as described with reference to FIGS. 1 and 4.

Generating 3200 a provider consent token responsive to the authorization request, the provider consent token comprising: (i) a service logic reference identifier indicating a location of provider service logic to be retrieved by the cloud execution service; and (ii) a cryptographic signature. The cryptographic signature may optionally be configured to enable the cloud execution service to confirm provider authorization. The generating 3200 (token issuance/signing) may, for example, be performed by the consent token generation engine 320 of the provider gateway 300 as described with reference to FIGS. 1 and 4.

Transmitting 3300 the provider consent token to the cloud execution service. This may, for example, enable the cloud execution service to instantiate an ephemeral execution container and execute the provider service logic identified by the service logic reference identifier. The transmitting 3300 may, for example, be performed by the authorization request interface 310 of the provider gateway 300 (optionally in cooperation with the consent token generation engine 320) as described with reference to FIGS. 1 and 4.

In one example, the user gateway 200 may be configured to operate in a terminal input state such that the user device maintains no application-level session state for provider service logic.

In some examples, a "user gateway" (or UserGate) may refer to a client-side interface component or operating environment associated with a user device, configured to capture and transmit raw user interactions to a cloud execution service and to receive and present non-executable interface data, while refraining from executing provider service logic locally.

In some examples, the user gateway 200 performs signal-level rendering (e.g., decoding pixel/frame streams or vector instructions) without performing semantic interpretation, business logic execution, or application flow control. In some examples, the user gateway encapsulates raw inputs into a payload devoid of semantic interpretation for transmission via an exclusive routing path.

In some examples, the user gateway 200 may be implemented as a software application running on top of an existing underlying operating system using minimal terminal-level services (e.g., device drivers, graphics, network stacks). In other examples, the user gateway 200 may be implemented as a firmware-level environment, a dedicated terminal shell, or an OS-replacing runtime that functionally neutralizes the underlying operating system regarding application execution.

In one example, the system comprises a cloud execution service 100 configured to instantiate ephemeral execution containers and determine user-interface states based on encrypted input data.

In some examples, a "cloud execution service" (or CloudGate) may refer to a sovereign cloud-based computational environment or distributed system configured to (i) receive and decrypt user input events, (ii) validate provider consent tokens, (iii) retrieve and execute provider service logic within isolated containers, and (iv) generate non-executable interface data for transmission to the user gateway.

In some examples, the cloud execution service 100 is configured to isolate the execution of provider service logic from its own underlying operating system such that the underlying operating system performs no application logic for the provider service logic. In some examples, it enforces a zero-residue execution state by automatically deleting retrieved logic and state upon session termination.

In some examples, the cloud execution service 100 may comprise a cluster of servers, virtualized processing units (vCPUs/vGPUs), trusted execution environments (TEEs), or secure enclaves configured to orchestrate the lifecycle of ephemeral execution containers.

In one example, the cloud execution service interacts with a provider gateway 300 associated with a target service to obtain authorization for execution.

In some examples, a "provider gateway" (or ProviderGate) may refer to a server, service, or interface associated with a service provider, configured to receive authorization requests and generate cryptographically signed provider consent tokens that enable the cloud execution service 100 to instantiate containers and execute specific provider service logic.

In some examples, the provider gateway 300 is configured to embed specific execution constraints (e.g., jurisdictional limits 300, time windows) and a service logic reference identifier into the provider consent token, effectively gating the retrieval of the service logic by the cloud execution service.

In some examples, the provider gateway 300 may be implemented as an API endpoint, an identity provider (IdP) service, or a dedicated authentication server managed by the entity providing the target service.

In one example, the cloud execution service 100 is configured to identify a target service based on user input events to determine which provider service logic to retrieve.

In some examples, a "target service" may refer to the specific application, platform, or digital functionality (e.g., a banking application, a ride-sharing service) that a user intends to interact with via the cloud execution service.

In some examples, the target service is identified via an intent determination engine based on a semantic analysis of user input events. The target service is distinct from the cloud execution service itself and is defined by the provider service logic retrieved using a service logic reference identifier.

In some examples, the target service corresponds to a web application, a mobile application, or a set of microservices referenced by a unique service identifier or blueprint within a provider consent token.

In one example, the user gateway 200 is configured to operate the user device in a terminal input state when participating in a cloud-executed operating operation.

In some examples, "terminal input state" may refer to a mandatory operational mode in which the user device functions strictly as an input-capture and display-presentation terminal for the cloud execution service, preventing any local execution of application logic associated with the target service.

In some examples, in the terminal input state, the user device maintains no application-level session state and no business-level session state for the provider service logic, performing input capture and output presentation only. The device remains capable of maintaining transport-level or security-level transient states (e.g., encryption keys, buffering) strictly necessary for secure streaming, which do not constitute application execution.

In some examples, the terminal input state may be realized via a kiosk mode, a lockdown mode, a dedicated terminal shell, a hypervisor-managed thin runtime, or firmware enforcement that constrains the device to terminal-level functions.

In one example, a Zero Local Execution model may be implemented by separating the execution environment from the interface environment.

In some examples, "Zero Local Execution" may refer to an architectural model in which provider service logic is not executed on the user device but is instead executed exclusively in a cloud execution environment 100 (e.g., within an ephemeral execution container).

In some examples, under Zero Local Execution, the user gateway 200 performs signal-level rendering and refrains from semantic interpretation, UI logic, business logic, decision-making, and application flow control.

In some examples, this model is enforced by an uplink that routes input exclusively to the cloud and a downlink that transmits only non-executable interface data, ensuring the user device remains a non-executive terminal.

In one example, the cloud execution service 100 transmits non-executable interface data to the user gateway 200 to represent the determined user-interface state.

In some examples, "non-executable interface data" may refer to interface-representation data configured to be renderable by the user gateway 200 via signal-level rendering without requiring semantic interpretation of the user-interface state or execution of provider service logic at the user gateway 200.

In some examples, the non-executable interface data strictly excludes the provider service logic itself (e.g., executable binaries or source code).

In some examples, the non-executable interface data comprises at least one of a pixel stream, a frame stream, a vector-based interface representation (e.g., drawing commands distinct from application logic), or a differential user interface update (e.g., UI deltas describing visual changes).

In one example, the user gateway 200 is configured to perform signal-level rendering of the received non-executable interface data.

In some examples, "signal-level rendering" may refer to the process of converting digital interface data into a visual display (e.g., activating display pixels) without interpreting application semantics, business rules, or logic structure associated with the content being displayed.

In some examples, signal-level rendering involves low-level graphics or driver operations required to visualize pixel streams, frame streams, or vector instructions, distinct from the computational execution of the application that generated said data.

In some examples, this includes decoding video codecs (e.g., H.264, AV1) or rasterizing vector primitives using standard graphics libraries, where such operations are devoid of decision-making capabilities regarding the target service.

In one example, the user gateway 200 captures user interaction as raw user input events for transmission to the cloud execution service 100.

In some examples, "raw user input events" may refer to device-captured input signals and/or input-derived event data representing user interactions, encapsulated in a format transmittable to the cloud execution service 100.

In some examples, raw user input events consists of input signals encapsulated in a payload that is devoid of semantic interpretation and structured metadata (e.g., devoid of interpreted commands like "buy item" or "open file," containing only the coordinates/keystrokes that led to such intent).

In some examples, these events may include touch coordinates, keystrokes, pointer movements, microphone samples, camera frames, and biometric data.

In one example, the user gateway 200 generates a user authorization token to cryptographically bind user consent to the transmitted input.

In some examples, a "user authorization token" may refer to a data structure issued by the user gateway 200 that evidences user consent for a specific operating operation and gates the cloud-side admissibility of the associated input data.

In some examples, the user authorization token is cryptographically bound to the encrypted input data (or raw user interactions) and to a user consent timestamp ($T_u$). It is configured to authenticate the origin of the input events and provide replay protection relative to $T_u$.

In some examples, the token comprises a digital signature or message authentication code (MAC) computed over the input payload and the timestamp $T_u$, and may further include a user identifier, device identifier, or session nonce.

In one example, the cloud execution service 100 utilizes a provider consent token to validate authorization before retrieving service logic.

In some examples, a "provider consent token" may refer to a data object generated by a provider gateway 300 that mechanically gates the cloud-side retrieval and instantiation of provider service logic.

In some examples, the provider consent token comprises a service logic reference identifier and a cryptographic signature used to validate provider authorization. The token may further comprise execution constraints (e.g., policy scopes, repetition limits) and a provider consent timestamp ($T_p$) representing the time of authorization.

In some examples, the provider consent token is a signed data structure containing the logic reference, validity conditions, and the digital signature of the provider gateway.

In one example, the provider consent token contains a service logic reference identifier used by the cloud execution service 100 to locate the code to be executed.

In some examples, a "service logic reference identifier" may refer to a pointer, look-up key, or address string embedded within the provider consent token that indicates the specific location or identity of the provider service logic to be retrieved by the cloud execution service 100.

In some examples, the identifier enables the cloud execution service 100 to fetch the correct logic module without requiring the logic itself to be transmitted within the token, thereby separating authorization (token) from execution (logic).

In this manner, separating authorization (provider consent token) from execution (provider service logic retrieved using the service logic reference identifier) can reduce data transmitted in authorization messaging while maintaining deterministic retrieval of the authorized logic module.

In some examples, the service logic reference identifier may comprise a hash of the original service logic, a URI pointing to a trusted repository, or a unique blueprint ID associated with a stored container image.

Accordingly, where the service logic reference identifier comprises a hash, the cloud execution service 100 can validate retrieved provider service logic as a function of the hash to mitigate substitution of an unapproved logic module.

In one example, the provider service logic may be retrieved and executed within the ephemeral execution container 100.

In some examples, "provider service logic" may refer to the executable instructions, rules, workflows, or application code supplied by or on behalf of a target service provider that, when executed, determines the user-interface state.

In some examples, the provider service logic is distinct from the underlying operating system of the cloud execution service and is executed in isolation such that the underlying OS performs no application logic for the provider service logic.

In some examples, provider service logic may comprise compiled binaries, interpreted scripts, bytecode, or AI models retrieved using the service logic reference identifier.

In one example, the cloud execution service 100 performs a Triple-Sync validation (or synchronization verification) to determine the admissibility of execution.

In some examples, "Triple-Sync validation" may refer to a conditional execution logic that validates the temporal synchronization between a user consent timestamp ($T_u$), a provider consent timestamp ($T_p$), and an AI verification timestamp ($T_{ai}$).

In some examples, this verification comprises determining that a time difference defined by the formula $T_{ai}-\max(T_u, T_p)$ is less than or equal to a predetermined threshold (N). Execution of the provider service logic is conditional on this synchronization verification. In some examples, this verification is not a one-time event but is performed recursively at a predetermined real-time re-validation interval throughout the duration of the ephemeral execution container's lifecycle.

In this manner, Triple-Sync validation and recursive re-validation can prevent instantiation or continued operation of an ephemeral execution container based on stale user consent and/or provider authorization.

In some examples, the validation effectively gates the instantiation of the ephemeral execution container, ensuring that neither the user consent nor the provider consent is stale relative to the AI verification time.

In one example, the provider service logic is executed within an ephemeral execution container.

In some examples, an "ephemeral execution container" may refer to a temporary, isolated execution environment instantiated by the cloud execution service specifically for a single session or operation and not intended for persistent reuse.

In some examples, the container is configured to isolate the execution of provider service logic from the underlying operating system of the cloud execution service. Furthermore, the container is configured to ensure a zero-residue execution state by automatically deleting the retrieved provider service logic and the determined user-interface state responsive to a termination of the executing.

In this manner, instantiating an ephemeral execution container per session and enforcing a zero-residue execution state can mitigate cross-session persistence of provider service logic and determined user-interface state after termination.

In some examples, this may be implemented using micro-VMs, secure enclaves, or disposable container runtimes that share no application state with the host OS.

In one example, an AI governance module may be associated with the cloud execution service 100.

In some examples, an "AI governance module" may refer to a logical component or service within the cloud execution service 100 configured to generate an AI verification timestamp ($T_{ai}$) and participate in the synchronization verification.

In some examples, the AI governance module acts as a "legal orchestrator" that validates the temporal and policy alignment of the user and provider tokens before permitting container instantiation. In further examples, the AI module is configured to generate the AI verification timestamp conditional upon a behavioral analysis of user command patterns and an intent evaluation matching the content of the user input events with an authorized scope defined by the provider consent token.

In some examples, this AI governance module may be a dedicated microservice or a trusted function within the cloud orchestration layer that enforces the Triple-Sync validation logic.

In one example, the cloud execution service 100 utilizes an intent determination engine to identify the target service.

In some examples, an "intent determination engine" may refer to a processing module configured to determine the target service based on a semantic analysis of the user input events.

In some examples, this engine analyzes the decrypted user input events to derive the user's intent (e.g., "open banking app") in order to select the appropriate provider consent token or service logic reference, distinct from the execution of the service logic itself.

In some examples, this may comprise a machine learning model or a rule-based classifier integrated into the cloud execution service's entry point.

In one example, the ephemeral execution container isolates logic from the underlying operating system.

In some examples, the "underlying operating system" may refer to the host operating system or hypervisor of the cloud execution service that manages physical resources.

In some examples, the underlying operating system is architecturally separated from the provider service logic such that it performs no application logic for the provider service logic (i.e., it does not execute the business rules or UI logic of the target service).

In one example, a cryptographically signed execution trace may be generated to evidence a execution session.

In some examples, a "cryptographically signed execution trace" (or digital legal trace) may refer to a tamper-evident record generated by the cloud execution service during the execution of the provider service logic.

In some examples, a "cryptographically signed execution trace" may refer to a specialized execution record that incorporates a Merkle-timestamped audit trail and a digitally signed contractual response-time stamp for each execution session. In further examples, the cryptographically signed execution trace serves as a self-signed certification of temporal compliance, verifying that the session adhered to the Triple-Sync validation constraints, the re-validation interval, and the latency threshold throughout its duration.

In this manner, sealing a cryptographically signed execution trace incorporating a Merkle-timestamped audit trail can provide a tamper-evident record of execution and certification of temporal and latency compliance.

In some examples, the trace comprises (i) a cryptographic commitment (e.g., a hash digest) to an execution-state representation of the ephemeral execution container generated during the executing, and (ii) an AI risk-evaluation summary associated with the user input events. The trace is sealed upon the termination of the executing for export to storage outside the ephemeral execution container. In some examples, the execution trace is constructed incrementally, where a digitally signed temporal-compliance report is generated in real-time at each re-validation interval to certify that the session constraints remained valid throughout the interval In some examples, the execution trace may incorporate Merkle-based auditing, third-party timestamp authority anchoring, and contractual response-time stamps to provide a verifiable history of the session.

In one example, the user gateway 200 transmits data via an exclusive routing path (or secure uplink).

In some examples, an "exclusive routing path" may refer to a secure uplink that routes encrypted input data exclusively from the user gateway 200 to the cloud execution service 100.

In some examples, this path is architecturally restricted such that the payload is isolated from interception by a local operating system, a local application, or a third-party service of the user device.

In some examples, exclusive routing may be achieved via kernel policy, secure tunneling, privileged gateways, dedicated hardware interfaces, or hardware-backed isolation mechanisms that bypass the general-purpose OS networking stack for this specific payload.

In one example, a zero-local-processing proof is generated, for example by the user gateway 200 or a component associated therewith.

In some examples, a 'zero-local-processing proof' may refer to cryptographic data and/or audit evidence generated to evidence that the user device operated in a terminal input state and maintained no application-level session state for the provider service logic. In some examples, the zero-local-processing proof is configured to be securely associable with one or more session-related artifacts, including at least one of encrypted input data, a user consent timestamp ($T_u$), and/or a user authorization token generated during the session, such that evidentiary value of the proof may be correlated to a particular user interaction payload, session, or admissibility decision.

In some examples, the zero-local-processing proof serves to verify that the user gateway 200 performed only input capture and output presentation without locally executing provider service logic.

In some examples, the association between the zero-local-processing proof and the user authorization token may be implemented according to various non-limiting configurations. In some examples, at least a portion of the zero-local-processing proof is encompassed within the user authorization token as a field, claim, or payload of the user authorization token itself. In some examples, the zero-local-processing proof is cryptographically bound to the user authorization token by a cryptographic relationship that enables one-way or mutual linkage between the proof and the token. In some examples, the zero-local-processing proof is transmitted or exported separately from the user authorization token while remaining correlatable thereto via one or more shared values, cross-references, digests, timestamps, and/or session identifiers. In some examples, the zero-local-processing proof includes multiple portions and may be implemented using any combination of the foregoing configurations.

In this manner, a zero-local-processing proof, optionally backed by a hardware attestation mechanism, can provide cryptographically verifiable evidence that the user gateway 200 adhered to the terminal input state during the session, while permitting efficient conveyance and verification of the proof by enabling correlation with the user authorization token, encrypted input data, and/or $T_u$ without requiring that a full proof be included in every instance of the user authorization token.

In some examples, the proof may be backed by hardware attestation (e.g., TEE, SE, TPM) certifying the integrity of the user gateway's execution environment, including by signing at least a portion of the proof using a hardware-protected key. In some examples, the user authorization token includes, or is otherwise associated with, a compact cryptographic commitment to the zero-local-processing proof, such as a digest, identifier, or attestation key identifier, and/or the zero-local-processing proof includes, or is otherwise associated with, a compact cryptographic commitment to the user authorization token, such as a digest or value derived therefrom, optionally incorporating $T_u$, thereby enabling reliable correlation between verified terminal input state and authorization of processing for encrypted input data. In some examples, the hardware attestation mechanism attests to, certifies, or otherwise vouches for a cryptographic identity or key material used directly or indirectly in generating, signing, and/or validating the user authorization token, thereby enabling a transitive chain of trust, while still permitting other association configurations consistent with the foregoing.

In one example, the user gateway 200 generates a Trusted UI Overlay to verify interface integrity.

In some examples, a "Trusted UI Overlay" may refer to a security-focused graphical layer generated locally by the user gateway 200—distinct from the cloud-generated interface stream—that is superposed onto the display to visually certify the authenticity of the session to the user.

In some examples, the overlay is digitally signed and refreshed at a periodic frequency (e.g., every 1-2 seconds) to prevent UI redress or overlay attacks, confirming that the underlying display is a valid, real-time transmission from the authorized cloud execution service 100.

Technical effect: Accordingly, a digitally signed Trusted UI Overlay refreshed at a predetermined frequency can mitigate UI redress attacks by providing a verifiable session-authenticity indicator at the user device.

In one example, a Contractual Response-Time Threshold (δ) may be enforced.

In some examples, a "Contractual Response-Time Threshold" (or δ) may refer to a pre-defined maximum allowable latency value defining the strict real-time performance bound for a valid execution session.

In some examples, if the measured response time exceeds this threshold, or if the Triple-Sync validation fails during a periodic re-validation, the cloud execution service 100 triggers an Auto-Revocation event, instantly terminating the ephemeral execution container and generating a non-compliance legal trace.

Accordingly, monitoring response latency against the contractual response-time threshold δ and triggering Auto-Revocation can bound end-to-end interaction latency for a valid execution session.

In one example, the user gateway 200 enforces a Zero-Resident Policy.

In some examples, a "Zero-Resident Policy" may refer to an operational constraint ensuring that no application code, executable binaries, or session data from the provider service logic are permanently stored or cached on the user device.

For example, upon session termination, all temporary artifacts may be wiped from memory, ensuring the device returns to a neutral state with no residual forensic evidence of the application logic.

The use of the terms "first", "second", "third", "fourth", "primary", "secondary", "tertiary", etc. does not imply any particular order. Such terms are used to identify and distinguish individual elements, features, data structures, signals, tokens, timestamps, modules, operations, steps, or other aspects, and are not intended to denote any order, priority, importance, spatial relationship, temporal relationship, or hierarchy. The labelling of a first element does not imply the presence of a second element and vice versa.

It may be appreciated that the Figures (e.g., FIGS. 1-5) may comprise some features, circuitries, modules, signals, data paths, communications, or operations illustrated with a solid line and some illustrated with a dashed line. It should be appreciated that operations and steps described herein (including operations described with reference to flowcharts such as FIGS. 6-8) need not be performed in the order presented; not all operations need be performed; and operations may be performed in any order and in any combination. Further, the claims may not recite all features or combinations disclosed herein. This disclosure, taken as a whole, describes examples and embodiments that may not be claimed herein but to which the applicant is entitled, and which may be the subject of related applications.

It is to be noted that the word "comprising" does not necessarily exclude the presence of other elements or steps than those listed.

It is to be noted that the words "a" or "an" preceding an element do not exclude the presence of a plurality of such elements.

It is to be noted that a list in the form of "at least one of A, B, or C, or any combination thereof" should be understood to mean "A", or "B", or "C", or "A and B", or "A and C", or "B and C", or "A and B and C".

It is to be noted that the term "indicative of" may be seen as "associated with", "related to", "descriptive of", "characterizing", and/or "defining". The terms "indicative of", "associated with", "related to", "descriptive of", "characterizing", and "defining" can be used interchangeably. The term "indicative of" can be seen as indicating a relation. For example, weight data indicative of weight may comprise one or more weight parameters.

It is to be noted that the word "based on" may be seen as "as a function of" and/or "derived from". The terms "based on" and "as a function of" can be used interchangeably. For example, a parameter determined "based on" a data set can be seen as a parameter determined "as a function of" the data set. A parameter or action may be determined or performed "based on" multiple inputs, items, or predicates. For example, a parameter or action may be "based at least in part on" a first input and "based at least in part on" a second input, which may or may not be expressly recited or claimed. In other words, the parameter may be an output of one or more functions with multiple inputs, including the data set as an input.

A function may be characterizing a relation between an input and an output, such as a mathematical relation, a database relation, a hardware relation, a logical relation, and/or other suitable relations.

It should further be noted that any reference signs do not limit the scope of the claims; that example embodiments may be implemented at least in part by means of hardware and/or software; and that several "means", "units", "modules", "components", "engines", "controllers", or "devices" may be represented by the same item of hardware.

The various example methods and systems described herein are described in the general context of method steps or processes, which may be implemented in one aspect by a computer program product, embodied in a computer-readable medium, including computer-executable instructions, such as program code, executed by one or more processors (including, in some examples, processors associated with a user gateway, a cloud execution service, a provider gateway, and/or a service logic repository). A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

Embodiments of methods and products (network node and wireless device) according to the disclosure are set out in the following items:

Item 1. A method performed by a network node configured as a cloud execution service comprising:
- receiving, at a cloud execution service, encrypted input data and a user authorization token cryptographically bound to the encrypted input data from a user gateway;
- decrypting, by the cloud execution service, the encrypted input data to obtain user input events;
- identifying, by the cloud execution service, a target service based on the user input events;
- obtaining a provider consent token associated with the target service, the provider consent token comprising a service logic reference identifier; validating, by the cloud execution service, the provider consent token to confirm provider authorization;
- instantiating, by the cloud execution service, an ephemeral execution container, responsive to successfully validating the provider consent token;
- retrieving, by the cloud execution service, provider service logic using the service logic reference identifier for execution within the ephemeral execution container;
- executing, in the ephemeral execution container, the provider service logic based on the user input events to determine a user-interface state;
- transmitting non-executable interface data representing the user-interface state from the cloud execution service to the user gateway.

Item 2. The method of Item 1, wherein the non-executable interface data comprises at least one of a pixel stream, a frame stream, a vector-based interface representation, or a differential user interface update, and wherein the non-executable interface data excludes the provider service logic.

Item 3. The method of Item 1 or 2, wherein the non-executable interface data is configured to be renderable by the user gateway via signal-level rendering without requiring semantic interpretation of the user-interface state or execution of the provider service logic at the user gateway.

Item 4. The method according to any of Items 1-3, wherein receiving the encrypted input data comprises receiving a payload via a secure uplink that routes the encrypted input data exclusively from the user gateway to the cloud execution service, such that the payload is isolated from interception, access, or processing by a local operating system, a local application, or a third-party service of a user device associated with the user gateway.

Item 5. The method according to any of Items 1-4, wherein identifying the target service comprises determining, by an intent determination engine of the cloud execution service, the target service based on a semantic analysis of the user input events.

Item 6. The method according to any of Items 1-5, wherein obtaining the provider consent token comprises receiving, at the cloud execution service, the provider consent token from a provider gateway associated with the target service.

Item 7. The method according to any of Items 1-6, wherein the provider consent token further comprises execution constraints, and wherein validating the provider consent token further comprises verifying that the user input events comply with the execution constraints.

Item 8. The method of Item 7, wherein the user authorization token comprises a user consent timestamp ($T_u$) cryptographically bound to the encrypted input data, and wherein the provider consent token comprises a provider consent timestamp ($T_p$) representing a time of provider authorization.

Item 9. The method of Item 8, wherein executing the provider service logic is conditional on a synchronization verification between: (i) the user consent timestamp ($T_u$); (ii) the provider consent timestamp ($T_p$); and (iii) an AI verification timestamp ($T_{ai}$) generated by an AI governance module associated with the cloud execution service; wherein the synchronization verification comprises determining that a time difference defined by $T_{ai}-\max(T_u, T_p)$ is less than or equal to a predetermined threshold (N).

Item 10. The method according to any of Items 1-9, wherein validating the provider consent token is performed based on a cryptographic signature and a validity condition contained in the provider consent token.

Item 11. The method according to any of Items 1-10, further comprising generating, prior to transmitting, the non-executable interface data, wherein the non-executable interface data represents an interactive user interface corresponding to the user-interface state.

Item 12. The method according to any of Items 1-11, wherein the user gateway is associated with a user device, and wherein transmitting the non-executable interface data comprises transmitting said data to the user gateway for presentation at the user device.

Item 13. The method according to any of Items 1-12, wherein the ephemeral execution container is configured to isolate the execution of the provider service logic from an underlying operating system of the cloud execution service such that the underlying operating system performs no application logic for the provider service logic.

Item 14. The method according to any of Items 1-13, further comprising: responsive to a termination of the executing, automatically deleting the retrieved provider service logic and the determined user-interface state from the ephemeral execution container.

Item 15. The method of Item 14, further comprising: generating, during the executing of the provider service logic, a cryptographically signed execution trace associated with the ephemeral execution container; and sealing the cryptographically signed execution trace upon the termination of the executing for export to storage outside the ephemeral execution container.

Item 16. The method of Item 15, wherein the cryptographically signed execution trace comprises: (i) a cryptographic commitment to an execution-state representation of the ephemeral execution container generated during the executing; and (ii) an AI risk-evaluation summary associated with the user input events.

Item 17. The method according to any of Items 15-16, wherein the cryptographically signed execution trace further comprises: a contractual response-time stamp certifying that the real-time response latency remained within a contractual response-time threshold (δ) throughout the execution of the provider service logic.

Item 18. The method according to any of Items 1-17, further comprising: monitoring, by the cloud execution service, a real-time response latency associated with the execution of the provider service logic; determining whether the real-time response latency exceeds a contractual response-time threshold (δ); and automatically revoking the user session and terminating the ephemeral execution container responsive to the real-time response latency exceeding the contractual response-time threshold.

Item 19. The method according to any of Items 1-12, further comprising: generating, by the cloud execution service, an attestation challenge nonce; transmitting the challenge nonce to the user gateway; receiving an attestation response comprising the challenge nonce; and rejecting the user authorization token responsive to a determination that the attestation response is not cryptographically bound to the nonce.

Item 20. The method according to any of Items 1-12, further comprising: generating, by an AI governance and auditing module associated with the cloud execution service, an attestation challenge nonce for admissibility gating; transmitting, by a secure interface transport controller, the challenge nonce to the user gateway; receiving, from an integrity and attestation module of the user gateway, attestation material or a zero-local-processing proof portion that is cryptographically bound to the challenge nonce; and providing a permit/deny outcome such that instantiation and/or continued operation of the ephemeral execution container is conditional on successful verification of the attestation material by the cryptographic authorization engine.

Item 21. The method according to any of Items 1-12, further comprising: responsive to a failed verification of at least one of (i) the provider consent token or (ii) the user authorization token or (iii) the zero-local-processing proof, terminating the user session and suppressing transmission of the non-executable interface data.

Item 22. The method according to any of Items 1-12, further comprising: responsive to a deny outcome from the AI governance and auditing module (or responsive to a failure of admissibility gating), triggering an Auto-Revocation event and causing the secure interface transport controller to suppress or discontinue transmission of the non-executable interface data for the user session.

Item 23. The method according to any of Items 15-17, wherein producing the cryptographic authorization artifact comprises cryptographically binding the cryptographic authorization artifact to at least one of: (i) a container instance identifier, (ii) a hash digest of the sealed cryptographically signed execution trace, or (iii) an identifier of an attestation key of the user gateway.

Item 24. The method according to any of Items 15-17, wherein producing the cryptographic authorization artifact under policy control comprises cryptographically binding the cryptographic authorization artifact to at least one of: (i) a cryptographic commitment to an execution-state representation of the ephemeral execution container as comprised in a cryptographically signed execution trace; (ii) a hash digest (or value derived therefrom) of the cryptographically signed execution trace; or (iii) an attestation key identifier associated with a compact cryptographic commitment to a zero-local-processing proof.

Item 25. The method according to Item 15, further comprising: transmitting at least a portion of the sealed cryptographically signed execution trace and/or the cryptographic authorization artifact to the provider gateway; and receiving, from the provider gateway, a verification result; wherein the cloud execution service suppresses completion of a transaction instruction representation responsive to the verification result indicating failure.

Item 26. The method according to Item 15, further comprising: transmitting, by the cloud execution service, at least one of (i) a cryptographic authorization artifact or (ii) a hash digest of a cryptographically signed execution trace, to a provider gateway for validation; receiving, from an authorization request interface of the provider gateway, a validation result; and suppressing completion of a transaction instruction representation responsive to the validation result indicating failure.

Item 27. The method according to Item 14, wherein executing the provider service logic comprises generating a transaction instruction representation within the ephemeral execution container; the method further comprising: producing a cryptographic authorization artifact corresponding to the transaction instruction representation only responsive to successfully validating the user authorization token; and enforcing a zero-residue execution state by automatically deleting the transaction instruction representation and the user-interface state responsive to a detection of a break in the cryptographic binding, thereby preventing issuance of the cryptographic authorization artifact.

Item 28. The method according to any of Items 1-10, further comprising: performing a recursive re-validation of the user authorization token and the provider consent token at a predetermined re-validation interval during the executing; and triggering an auto-revocation event to terminate the ephemeral execution container responsive to a failure of the recursive re-validation.

Item 29. The method according to any of Items 1-28, wherein execution of provider service logic within the ephemeral execution container is admissible only when the provider service logic is retrieved by the cloud execution service from a service logic repository using a service logic reference identifier contained in a validated provider consent token.

Item 30. The method according to any of Items 1-29, wherein execution admissibility is rejected if the provider service logic is supplied from a source other than the service logic repository, including client-side logic, locally cached logic, or externally injected logic, regardless of functional equivalence.

Item 31. The method according to any of Items 1-30, wherein a cryptographically signed execution trace includes a cryptographic commitment to the service logic reference identifier corresponding to the provider service logic retrieved from a service logic repository.

Item 32. A method performed by a user device configured as a user gateway, the method comprising:

capturing raw user interactions at the user device;

generating encrypted input data from the raw user interactions and generating a user authorization token cryptographically bound to said encrypted input data;

transmitting the encrypted input data to a cloud execution service;

receiving, from the cloud execution service, non-executable interface data; representing a user-interface state; and presenting the non-executable interface data at the user device.

Item 33. The method of Item 32, wherein the raw user interactions consist of device-captured input signals, and wherein generating the encrypted input data comprises encapsulating said input signals in a payload that is devoid of semantic interpretation and structured metadata.

Item 34. The method according to any of Items 32-33, wherein transmitting the encrypted input data comprises routing said data via an exclusive routing path configured to prevent a local operating system, a local application, or a third-party service of the user device from intercepting, accessing, or processing the raw user interactions.

Item 35. The method according to any of Items 32-34, wherein presenting the non-executable interface data comprises performing signal-level rendering of the non-executable interface data to generate a visual display without interpreting application semantics and without executing provider service logic at the user device.

Item 36. The method according to any of Items 32-35, wherein the user gateway is configured to operate in a terminal input state such that the user device maintains no application-level session state for the provider service logic and performs input capture and output presentation only.

Item 37. The method according to any of Items 32-36, further comprising: generating, by the user gateway, a zero-local-processing proof configured to evidence that the user device operated in a terminal input state and maintained no application-level session state for the provider service logic; wherein the zero-local-processing proof is backed by a hardware attestation mechanism of the user device comprising at least one of a Trusted Execution Environment (TEE) or a Secure Element (SE).

Item 38. The method according to any of Items 32-37, further comprising: generating a trusted user interface overlay that is digitally signed and superposed onto the presented non-executable interface data; wherein the trusted user interface overlay is refreshed periodically at a predetermined frequency to verify an integrity of the user gateway during presenting the non-executable interface data.

Item 39. The method according to Item 37 wherein the zero-local-processing proof evidences compliance with a Zero-Resident Policy, wherein the zero-local-processing proof confirms, via the hardware attestation mechanism, that: (i) no application code or executable binaries associated with the provider service logic were stored or cached in a memory of the user device; and (ii) the user device maintained no application-level session state for the provider service logic during the presenting.

Item 40. A method performed by a network node configured as a provider gateway associated with a target service, the method comprising:

receiving, from a cloud execution service, an authorization request associated with a user session;

generating a provider consent token responsive to the authorization request, the provider consent token comprising: (i) a service logic reference identifier indicating a location of provider service logic to be retrieved by the cloud execution service; and (ii) a cryptographic signature; and transmitting the provider consent token to the cloud execution service.

Item 41. The method according to Item 40 further comprising: receiving, from the cloud execution service, a cryptographic authorization artifact associated with the user session; verifying that the cryptographic authorization artifact is cryptographically bound to at least one of (i) the provider consent token, or (ii) a sealed cryptographically signed execution trace; and rejecting the authorization request responsive to a failed verification.

Item 42. The method according to Item 40 further comprising: receiving, at an authorization request interface, an authorization request comprising a cryptographic authorization artifact generated within an ephemeral execution container; verifying, by the authorization request interface, that the cryptographic authorization artifact is cryptographically bound to at least one of (i) a corresponding provider consent token or a validity condition thereof, or (ii) a cryptographically signed execution trace (or a hash digest thereof) generated by the cloud execution service for the user session; and rejecting the authorization request responsive to a failed verification.

Item 43. The method according to Item 40 wherein generating the provider consent token comprises embedding at least one validity condition comprising a time window (and optionally a nonce value) as an execution constraint enforceable by the cloud execution service; and wherein the provider gateway rejects an authorization request comprising a cryptographic authorization artifact unless the cryptographic authorization artifact is cryptographically bound to the validity condition and satisfies the time window.

Item 44. A network node configured as a cloud execution service comprising: one or more processors; and one or more non-transitory computer-readable media storing instructions that, when executed by the one or more processors, cause the network node to perform operations comprising:

receiving encrypted input data cryptographically bound to a user authorization token from a user gateway;

decrypting the encrypted input data to obtain user input events;

identifying a target service based on the user input events;

obtaining a provider consent token associated with the target service, the provider consent token comprising a service logic reference identifier;

validating the provider consent token to confirm provider authorization; instantiating an ephemeral execution container, responsive to successfully validating the provider consent token;

retrieving provider service logic using the service logic reference identifier for execution within the ephemeral execution container;

executing, in the ephemeral execution container, the provider service logic based on the user input events to determine a user-interface state; and transmitting non-executable interface data representing the user-interface state to the user gateway.

Item 45. The network node of Item 44, wherein the instructions further cause the network node to perform the method of any of Items 2-31.

Item 46. A user device configured as a user gateway comprising: one or more processors; and one or more non-transitory computer-readable media storing instructions that, when executed by the one or more processors, cause the user device to perform operations comprising:

capturing raw user interactions at the user device;

generating encrypted input data from the raw user interactions and generating a user authorization token cryptographically bound to said encrypted input data;

transmitting the encrypted input data to a cloud execution service to trigger instantiation of an ephemeral execution container based on a provider consent token;

receiving, from the cloud execution service, non-executable interface data representing a user-interface state, wherein the user-interface state is determined by the cloud execution service executing provider service logic within the ephemeral execution container based on user input events derived from the raw user interactions; and presenting the non-executable interface data at the user device.

Item 47. The user device of Item 46, wherein the instructions further cause the user device to perform the method of any of Items 33-39.

Item 48. A network node configured as a provider gateway comprising: one or more processors; and one or more non-transitory computer-readable media storing instructions that, when executed by the one or more processors, cause the network node to perform operations comprising:

receiving, from a cloud execution service, an authorization request associated with a user session;

generating a provider consent token responsive to the authorization request, the provider consent token comprising: (i) a service logic reference identifier indicating a location of provider service logic to be retrieved by the cloud execution service; and (ii) a cryptographic signature configured to enable the cloud execution service to confirm provider authorization; and transmitting the provider consent token to the cloud execution service, thereby enabling the cloud execution service to instantiate an ephemeral execution container and execute the provider service logic identified by the service logic reference identifier.

Item 49. The network node of Item 48, wherein the instructions further cause the network node to perform the method of Item 41-43.

Item 50. A method performed by a system comprising a cloud execution service, a provider gateway, and a user device configured as a user gateway, the method comprising:

receiving, at the cloud execution service from the user gateway, encrypted input data derived from raw user interactions together with a user authorization token cryptographically bound to the encrypted input data;

decrypting the encrypted input data to obtain user input events and identifying a target service based on the user input events;

transmitting an authorization request associated with a user session from the cloud execution service to the provider gateway, and receiving, at the cloud execution service from the provider gateway, a provider consent token comprising a service logic reference identifier and a cryptographic signature;

validating the provider consent token and, responsive to successful validation, instantiating an ephemeral execution container, retrieving provider service logic using the service logic reference identifier, and executing the provider service logic based on the user input events to determine a user-interface state;

transmitting non-executable interface data representing the user-interface state from the cloud execution service to the user gateway; and presenting the non-executable interface data at the user device.

Item 51. The method of Item 50, wherein execution of provider service logic within the ephemeral execution container and determination of a user-interface state are technically linked to execution admissibility, and wherein such execution admissibility requires that user inputs are captured, the user authorization token cryptographically bound to the inputs is generated, and encrypted input data is transmitted via the user gateway operating in a terminal state that prevents local execution of the provider service logic, such that non-compliance with said execution results in rejection of execution admissibility or prevention of session continuation.

Item 52. The method of Item 50 or 51, wherein execution admissibility of provider service logic is rejected or output of non-executable interface data is suppressed upon detection of any of the following conditions:

(i) bypassing the user gateway or replacing it with a functionally equivalent component;

(ii) any full or partial local execution of the provider service logic or semantic interpretation of user inputs on the user device; or (iii) presence of a fallback execution state or an alternative execution path that does not pass through the user gateway, even where a functionally equivalent result is achieved.

Item 53. The method according to any of Items 50-52, wherein execution of provider service logic within the ephemeral execution container is conditionally admissible only when user input events are captured, encrypted, and transmitted exclusively via the user gateway, wherein the user gateway performs raw input capture and signal-level rendering of non-executable interface data while refraining from semantic interpretation, decision-making, intent inference, or local execution of provider service logic.

Item 54. The method according to any of Items 50-53, wherein the service logic repository operates as the sole recognized source of executable provider service logic, and wherein any alternative execution model permitting provider service logic to be executed from multiple repositories, distributed sources, mirrored stores, or provider-controlled execution locations is deemed non-admissible, such that the method enforces a single exclusive execution authority.

Item 55. The method according to any of Items 50-54, wherein a provider is prohibited from independently executing, re-hosting, or re-authorizing execution of its service logic outside the execution-admissibility framework enforced by the cloud execution service, and wherein any provider-side attempt to assert autonomous execution control results in rejection of execution admissibility and invalidation of the session.

Item 56. The method according to any of Items 50-55, wherein Zero Local Execution on the user device is enforced as a system-level exclusivity condition, such that any architecture, implementation, or deployment that achieves equivalent functional outcomes while permitting partial local execution, hybrid execution, client-side optimization, or delegated execution control is deemed non-compliant and non-admissible.

Item 57. A system comprising:

a network node configured as a cloud execution service, comprising one or more processors and one or more non-transitory computer-readable media storing instructions that, when executed, cause the network node to: receive encrypted input data and a user authorization token cryptographically bound to the encrypted input data from a user gateway; decrypt the encrypted input data to obtain user input events and identify a target service; obtain, from a provider gateway, a provider consent token comprising a service logic reference identifier and a cryptographic signature; validate the provider consent token and, responsive to successful validation, instantiate an ephemeral execution container, retrieve provider service logic using the service logic reference identifier, and execute the provider service logic based on the user input events to determine a user-interface state; and transmit non-executable interface data representing the user-interface state to the user gateway;

a network node configured as a provider gateway, comprising one or more processors and one or more non-transitory computer-readable media storing instructions that, when executed, cause the network node to: generate and transmit, to the cloud execution service, the provider consent token comprising the service logic reference identifier and the cryptographic signature; and a user device configured as a user gateway, comprising one or more processors and one or more non-transitory computer-readable media storing instructions that, when executed, cause the user device to: capture raw user interactions;

generate the encrypted input data and the user authorization token cryptographically bound thereto; transmit the encrypted input data and the user authorization token to the cloud execution service; receive the non-executable interface data from the cloud execution service; and present the non-executable interface data at the user device.

Item 58. A computer-implemented method for enforcing execution admissibility of provider service logic in a cloud-executed operating environment, the method comprising:

enforcing a Zero Local Execution policy on a user device as a mandatory condition for execution admissibility, by blocking invocation and execution of the provider service logic on the user device outside a mandatory user gateway;

wherein execution of provider service logic is deemed admissible only when all data transmission between the user device and a cloud execution service are performed exclusively through a user gateway operating on the user device in a terminal input state;

wherein the user gateway is configured as the policy enforcement point defining the exclusive execution admissibility boundary between the user device and the cloud execution service;

wherein any execution, decision-making, semantic interpretation, application logic processing, or functional delegation associated with provider service logic is prohibited from occurring on the user device outside said user gateway; and, wherein the Zero Local Execution policy is not satisfied if the provider service logic is executed on the user device outside the user gateway or if communications between the user device and the cloud execution service bypass the user gateway.

Item 59. The method of Item 58, wherein the user gateway is configured to:

capture raw user input signals without semantic interpretation or local execution of the provider service logic;

transmit said inputs exclusively to the cloud execution service;

receive non-executable interface data generated by the cloud execution service and, present said interface data via signal-level rendering without application logic execution on the user device;

wherein the Zero Local Execution policy is not satisfied if (i) the user gateway performs semantic interpretation, decision-making, or execution of the provider service logic, or (ii) user input signals or the non-executable interface data bypass the user gateway.

What is claimed is:

1. A system comprising:

a network node configured as a cloud execution service, comprising one or more processors and one or more non-transitory computer-readable media storing instructions that, when executed, cause the network node to: receive encrypted input data and a user authorization token cryptographically bound to the encrypted input data from a user gateway; decrypt the encrypted input data to obtain user input events and identify a target service; obtain, from a provider gateway, a provider consent token comprising a service logic reference identifier and a cryptographic signature; validate the provider consent token and, responsive to successful validation, instantiate an ephemeral execution container, retrieve provider service logic using the service logic reference identifier, and execute the provider service logic based on the user input events to determine a user-interface state; and transmit non-executable interface data representing the user-interface state to the user gateway;

a network node configured as a provider gateway, comprising one or more processors and one or more non-transitory computer-readable media storing instructions that, when executed, cause the network node to: generate and transmit, to the cloud execution service, the provider consent token comprising the service logic reference identifier and the cryptographic signature; and a user device configured as a user gateway, comprising one or more processors and one or more non-transitory computer-readable media storing instructions that, when executed, cause the user device to: capture raw user interactions; generate the encrypted input data and the user authorization token cryptographically bound thereto; transmit the encrypted input data and the user authorization token to the cloud execution service; receive the non-executable interface data from the cloud execution service; and present the non-executable interface data at the user device.

2. A method performed by a network node configured as a cloud execution service comprising:

receiving, at a cloud execution service, encrypted input data cryptographically bound to a user authorization token from a user gateway;

decrypting, by the cloud execution service, the encrypted input data to obtain user input events;

identifying, by the cloud execution service, a target service based on the user input events;

obtaining a provider consent token associated with the target service, the provider consent token comprising a service logic reference identifier;

validating, by the cloud execution service, the provider consent token to confirm provider authorization;

instantiating, by the cloud execution service, an ephemeral execution container, responsive to successfully validating the provider consent token;

retrieving, by the cloud execution service, provider service logic using the service logic reference identifier for execution within the ephemeral execution container;

executing, in the ephemeral execution container, the provider service logic based on the user input events to determine a user-interface state;

transmitting non-executable interface data representing the user-interface state from the cloud execution service to the user gateway.

3. The method of claim 2, wherein the non-executable interface data comprises at least one of a pixel stream, a frame stream, a vector-based interface representation, or a differential user interface update, and wherein the non-executable interface data excludes the provider service logic.

4. The method of claim 2, wherein the non-executable interface data is configured to be renderable by the user gateway via signal-level rendering without requiring semantic interpretation of the user-interface state or execution of the provider service logic at the user gateway.

5. The method of claim 2, wherein receiving the encrypted input data comprises receiving a payload via a secure uplink that routes the encrypted input data exclusively from the user gateway to the cloud execution service, such that the payload is isolated from interception, access, or processing by a local operating system, a local application, or a third-party service of a user device associated with the user gateway.

6. The method of claim 2, wherein identifying the target service comprises determining, by an intent determination engine of the cloud execution service, the target service based on a semantic analysis of the user input events.

7. The method of claim 2, wherein obtaining the provider consent token comprises receiving, at the cloud execution service, the provider consent token from a provider gateway associated with the target service, wherein the provider consent token further comprises execution constraints, and wherein validating the provider consent token further comprises verifying that the user input events comply with the execution constraints.

8. The method of claim 7, wherein the user authorization token comprises a user consent timestamp ($T_u$) cryptographically bound to the encrypted input data, and wherein the provider consent token comprises a provider consent timestamp ($T_p$) representing a time of provider authorization, and wherein executing the provider service logic is conditional on a synchronization verification between: (i) the user consent timestamp ($T_p$); (ii) the provider consent timestamp ($T_p$); and (iii) an AI verification timestamp ($T_{ai}$) generated by an AI governance module associated with the cloud execution service; wherein the synchronization verification comprises determining that a time difference defined by $T_{ai}-\max(T_u, T_p)$ is less than or equal to a predetermined threshold (N).

9. The method of claim 2, further comprising: responsive to a termination of the executing, automatically deleting the retrieved provider service logic and the determined user-interface state from the ephemeral execution container to ensure a zero-residue execution state, wherein the method further comprises:

generating, during the executing of the provider service logic, a cryptographically signed execution trace associated with the ephemeral execution container; and, sealing the cryptographically signed execution trace upon the termination of the executing for export to storage outside the ephemeral execution container.

10. The method of claim 2, further comprising: monitoring, by the cloud execution service, a real-time response latency associated with the execution of the provider service logic; determining whether the real-time response latency exceeds a contractual response-time threshold; and automatically revoking the user session and terminating the ephemeral execution container responsive to the real-time response latency exceeding the contractual response-time threshold.

11. The method of claim 2, wherein executing the provider service logic comprises generating a transaction instruction representation and producing a cryptographic authorization artifact, the cryptographic authorization artifact comprising at least one of a signature, a token, or a cryptographic proof.

12. The method of claim 11, further comprising suppressing issuance of the cryptographic authorization artifact responsive to a determination that a validity condition of the provider consent token and/or an execution constraint is not satisfied.

13. The method of claim 12, further comprising: wherein the producing of the cryptographic authorization artifact is performed only responsive to successfully validating the user authorization token; and deleting the transaction instruction representation and the user-interface state responsive to detecting a failure to verify a cryptographic binding between the user authorization token and the transaction instruction representation.

14. The method of claim 2, further comprising: responsive to a failed verification of at least one of (i) the provider consent token or (ii) the user authorization token or (iii) a zero-local-processing proof, terminating the user session and suppressing transmission of the non-executable interface data.

15. A method performed by a user device configured as a user gateway, the method comprising:

capturing raw user interactions at the user device, wherein the raw user interactions consist of device-captured input signals;

generating encrypted input data from the raw user interactions and generating a user authorization token cryptographically bound to said encrypted input data, wherein generating the encrypted input data comprises encapsulating said input signals in a payload that is devoid of semantic interpretation and structured metadata;

transmitting the encrypted input data and user authorization token to a cloud execution service to trigger instantiation of an ephemeral execution container based on a provider consent token;

receiving, from the cloud execution service, non-executable interface data representing a user-interface state, wherein the user-interface state is determined by the cloud execution service executing provider service logic within the ephemeral execution container based on user input events derived from the raw user interactions; and, presenting the non-executable interface data at the user device.

16. The method of claim 15, wherein presenting the non-executable interface data comprises performing signal-level rendering of the non-executable interface data to generate a visual display without interpreting application semantics and without executing the provider service logic at the user device.

17. The method of claim 15, further comprising: generating, by the user gateway, a zero-local-processing proof configured to evidence that the user device operated in a terminal input state and maintained no application-level session state for the provider service logic; wherein the zero-local-processing proof is backed by a hardware attestation mechanism of the user device.

18. The method of claim 17, wherein the user authorization token comprises a cryptographic commitment to the zero-local-processing proof comprising at least one of a hash digest of at least a portion of the zero-local-processing proof, a proof identifier, or an attestation key identifier.

19. The method of claim 15, further comprising: generating a trusted user interface overlay that is digitally signed and superposed onto the presented non-executable interface data; wherein the trusted user interface overlay is refreshed periodically at a predetermined frequency to verify an integrity of the user gateway during presenting the non-executable interface data.

20. The method of claim 15, wherein the user gateway is configured to operate in a terminal input state such that the user device maintains no application-level session state for the provider service logic and performs input capture and output presentation only.

21. The method according to claim 15, wherein the user device is configured to operate in a terminal input state that prevents execution of provider service logic on the user device; and, wherein capture of user interactions, transmission of encrypted input data, reception of interface output, and presentation of the interface are performed via the user gateway operating as an execution mediation point between the user device and the cloud execution service; and, wherein execution admissibility of the provider service logic is conditioned on maintaining an absence of local execution of the provider service logic on the user device during a user session.

22. A network node configured as a cloud execution service comprising:

one or more processors; and one or more non-transitory computer-readable media string instructions that, when executed by the one or more processors, cause the network node to perform operations comprising:

receiving encrypted input data cryptographically bound to a user authorization token from a user gateway;

decrypting the encrypted input data to obtain user input events;

identifying a target service based on the user input events;

obtaining a provider consent token associated with the target service, the provider consent token comprising a service logic reference identifier;

validating the provider consent token to confirm provider authorization;

instantiating an ephemeral execution container, responsive to successfully validating the provider consent token;

retrieving provider service logic using the service logic reference identifier for execution within the ephemeral execution container;

executing, in the ephemeral execution container, the provider service logic based on the user input events to determine a user-interface state; and transmitting non-executable interface data representing the user-interface state to the user gateway.

* * * * *